(12) United States Patent
Liang et al.

(10) Patent No.: US 11,978,844 B2
(45) Date of Patent: May 7, 2024

(54) ELECTRODE ASSEMBLY AND RELATED BATTERY, BATTERY MODULE

(71) Applicant: Contemporary Amperex Technology Co., Limited, Ningde (CN)

(72) Inventors: Chengdu Liang, Ningde (CN); Hu Xu, Ningde (CN); Haizu Jin, Ningde (CN); Yuqun Zeng, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 687 days.

(21) Appl. No.: 17/135,741

(22) Filed: Dec. 28, 2020

(65) Prior Publication Data

US 2021/0376372 A1    Dec. 2, 2021

Related U.S. Application Data

(63) Continuation of application No. PCT/CN2020/094037, filed on Jun. 2, 2020.

(51) Int. Cl.
*H01M 10/04* (2006.01)
*H01M 10/0585* (2010.01)
(Continued)

(52) U.S. Cl.
CPC ... *H01M 10/0431* (2013.01); *H01M 10/0413* (2013.01); *H01M 10/0585* (2013.01);
(Continued)

(58) Field of Classification Search
CPC ......... H01M 10/0431; H01M 10/0413; H01M 10/0585; H01M 10/0587; H01M 50/204;
(Continued)

(56) References Cited

U.S. PATENT DOCUMENTS

| 8,293,391 | B2 | 10/2012 | Kawase |
| 10,217,988 | B2 | 2/2019 | Takeda et al. |

(Continued)

FOREIGN PATENT DOCUMENTS

| CN | 2922148 Y | 7/2007 |
| CN | 201207413 Y | 3/2009 |

(Continued)

OTHER PUBLICATIONS

Extended European Search Report issued in European Application No. 20810849.8, mailed Sep. 13, 2021, 11 pages.

(Continued)

*Primary Examiner* — Daniel S Gatewood
(74) *Attorney, Agent, or Firm* — STERNE, KESSLER, IGOLDSTEIN & FOX P.L.L.C.

(57) ABSTRACT

An electrode assembly and a related battery, and battery module are provided, wherein the electrode assembly includes: at least one positive electrode plate and at least one negative electrode plate, the number of all the positive and negative electrode plates is greater than or equal to 3; the positive and negative electrode plates are wound around the winding axis and arranged in a superimposing manner along a direction vertical to the winding axis, each positive electrode plate includes a positive main body part, at least part of the positive main body part is a positive active substance area, each negative electrode plate includes a negative main body part, at least part of the negative main body part is the negative active substance area, two ends of the negative active substance area along the winding axis both exceed corresponding ends of the adjacent positive active substance area.

18 Claims, 10 Drawing Sheets

(51) Int. Cl.
    *H01M 10/0587*    (2010.01)
    *H01M 50/204*    (2021.01)
    *H01M 50/249*    (2021.01)
(52) U.S. Cl.
    CPC ..... *H01M 10/0587* (2013.01); *H01M 50/204*
             (2021.01); *H01M 50/249* (2021.01)
(58) Field of Classification Search
    CPC ............. H01M 50/249; H01M 50/383; H01M
             50/548; H01M 2004/021; H01M 2220/30;
             H01M 10/0525; H01M 4/0433; H01M
             4/505; H01M 4/5825; H01M 4/587;
             H01M 50/55; H01M 2220/20; H01M
             10/0409; H01M 10/052; H01M 10/054;
             H01M 10/4235; H01M 50/531; Y02E
             60/10; Y02P 70/50
    See application file for complete search history.

(56) References Cited

U.S. PATENT DOCUMENTS

| | | | |
|---|---|---|---|
| 10,644,322 | B2 | 5/2020 | Xing et al. |
| 2013/0244073 | A1 | 9/2013 | Fujimoto et al. |
| 2016/0126528 | A1* | 5/2016 | Park .................... H01M 50/557 |
| | | | 429/94 |

FOREIGN PATENT DOCUMENTS

| | | | | |
|---|---|---|---|---|
| CN | 201408811 | Y | | 2/2010 |
| CN | 102084533 | A | | 6/2011 |
| CN | 202308207 | U | * | 7/2012 |
| CN | 202308207 | U | | 7/2012 |
| CN | 103415955 | A | | 11/2013 |
| CN | 104810561 | A | | 7/2015 |
| CN | 107210494 | A | | 9/2017 |
| CN | 108428849 | A | | 8/2018 |
| CN | 108886128 | A | | 11/2018 |
| CN | 109755462 | A | | 5/2019 |
| CN | 209401755 | U | | 9/2019 |
| CN | 108281662 | B | | 5/2020 |
| CN | 111326699 | A | | 6/2020 |
| JP | 2011233408 | A | | 11/2011 |
| KR | 1020100102059 | A | | 9/2010 |
| WO | WO-2017174374 | A1 | * | 10/2017 ............. H01G 11/12 |

OTHER PUBLICATIONS

Intention to Grant issued in European Patent Application No. 20810849.8, mailed Jan. 12, 2023, 53 pages.

* cited by examiner

ELECTRODE ASSEMBLY AND RELATED BATTERY, BATTERY MODULE

CROSS-REFERENCE TO RELATED APPLICATION

This application is a continuation of International Application No. PCT/CN2020/094037 filed on Jun. 2, 2020, the disclosures of which are hereby incorporated in their entirety by reference.

TECHNICAL FIELD

The present disclosure relates to the field of batteries, in particular to an electrode assembly and a related battery, battery module.

BACKGROUND

Owing to such advantages as small size, high energy density, high power density, multiple cycles and long storage time, lithium-ion batteries and the like are widely used in some electronic equipment, electric transportation tools, electric toys and electric devices, for example, lithium ion batteries have been widely used in mobile phones, notebook computers, battery cars, electric vehicles, electric airplanes, electric ships, electric toy cars, electric toy ships, electric toy airplanes and electric tools.

Along with continuous development of the lithium-ion battery technology, a higher requirement is proposed on the performance of the lithium-ion battery, the lithium-ion batteries are expected to be smaller, lighter, and store more energy, therefore, the energy density of the lithium-ion batteries needs to be improved continuously.

At present, a plurality of methods for improving energy density of the lithium-ion batteries are available, for example, the energy density of the lithium-ion battery can be improved from the structure, for example, the proportion accounted for by the positive and negative active substances in the lithium-ion battery can be improved, and another method for improving the energy density of the lithium-ion battery is to reduce the thickness of the diaphragm. For another example, the energy density of the lithium-ion battery can be improved from the materials, for example, different positive and negative active substances can be selected. For still another example, the energy density of the lithium-ion battery can be improved through controlling the amount of electrolyte, for example, the energy density of the lithium-ion battery can be effectively improved through reducing the amount of the electrolyte. For still another example, the energy density of the lithium-ion battery can also be improved through improving the charging cut-off voltage.

However, no matter which of the above methods for improving the energy density of the lithium-ion battery is adopted, more or less problems will exist, for example, certain problems will exist in the cost, process or safety.

SUMMARY

According to a first aspect of the present disclosure, an electrode assembly is provided, including:

at least one positive electrode plate and at least one negative electrode plate, wherein the sum of the number of all the positive electrode plates and all the negative electrode plates is greater than or equal to 3, and at least one positive electrode plate and at least one negative electrode plate are wound around a winding axis to form a winding structure, wherein in a winding structure, a positive electrode plate of the at least one positive electrode plate and a negative electrode plate of the at least one negative electrode plate are arranged in a superimposing manner along a direction vertical to the winding axis;

wherein each positive electrode plate of the at least one positive electrode plate includes a positive main body part, and at least part of the area of a superimposing surface of the positive main body part is a positive active substance area. Each negative electrode plate of the at least one negative electrode plate includes a negative main body part, at least part of the area of the superimposing surface of the negative main body part is a negative active substance area, and two ends, along the winding axis, of the negative active substance area both exceed corresponding ends of the adjacent positive active substance area.

In some embodiments, two ends, along the winding axis, of the negative active substance area both exceed corresponding ends of the adjacent positive active substance area by a range of 0.2 mm to 5 mm.

In some embodiments, the electrode assembly further includes a plurality of diaphragms, and adjacent positive electrode plate and negative electrode plate are separated from each other through a diaphragm.

In some embodiments, the positive electrode plate further includes at least one positive tab part which extends outwards along the direction of the winding axis from the positive main body part, and the negative electrode plate further includes at least one negative tab part which extends outwards along the direction of the winding axis from the negative main body part.

In some embodiments, part of the area of the positive main body part is a first insulating layer coating area, the first insulating layer coating area is arranged on a side, adjacent to the positive tab part, of the positive active substance area, and a first end, adjacent to the negative tab part along the direction of the winding axis, of the negative main body part is arranged in the first insulating layer coating area.

In some embodiments, the negative active substance area covers the whole superimposing surface, along the winding axis, of the negative main body part, and a second end, far away from the negative tab part along the direction of the winding axis, of the negative main body part exceeds the positive active substance area.

In some embodiments, when the number of at least one positive electrode plate is greater than or equal to 2, the positions of the first winding tail ends of at least two positive electrode plates are different; and/or, when the number of at least one negative electrode plate is greater than or equal to 2, the positions of the second winding tail ends of at least two negative electrode plates are different.

In some embodiments, when the number of at least one positive electrode plate is greater than or equal to 2, the positions of the first winding initial ends of at least two positive electrode plates are different; and/or, when the number of at least one negative electrode plate is greater than or equal to 2, the positions of the second winding initial ends of at least two negative electrode plates are different.

In some embodiments, the winding structure is flat, and includes a flattening area and turning areas arranged on two sides of the flattening area, wherein the first winding tail ends of at least one positive electrode plate in all the positive electrode plates are arranged in the turning area; and/or, the second winding tail ends of at least one negative electrode plate in all the negative electrode plates are arranged in the turning area.

In some embodiments, in different radial directions of the winding structure, the difference of layers of electrode plates does not exceed the number of preset layers.

In some embodiments, the number of preset layers is smaller than or equal to the sum of the number of all the positive electrode plates and all the negative electrode plates.

In some embodiments, an outermost layer and an innermost layer of the winding structure are all negative electrode plates.

According to a second aspect of the present disclosure, a battery is provided, including:
 a housing; and
 an electrode assembly in the above embodiments, wherein the electrode assembly is arranged in the housing.

According to a third aspect of the present disclosure, a battery module is provided, including: a plurality of batteries in the above embodiments.

BRIEF DESCRIPTION OF THE DRAWINGS

The drawings described herein provide a further understanding of the present disclosure, and constitute a part of the present disclosure. The exemplary embodiments of the present disclosure and descriptions thereof are used for explaining the present disclosure, rather than constituting an improper limitation to the present disclosure. In the drawings.

DETAILED DESCRIPTION

Figure 1:
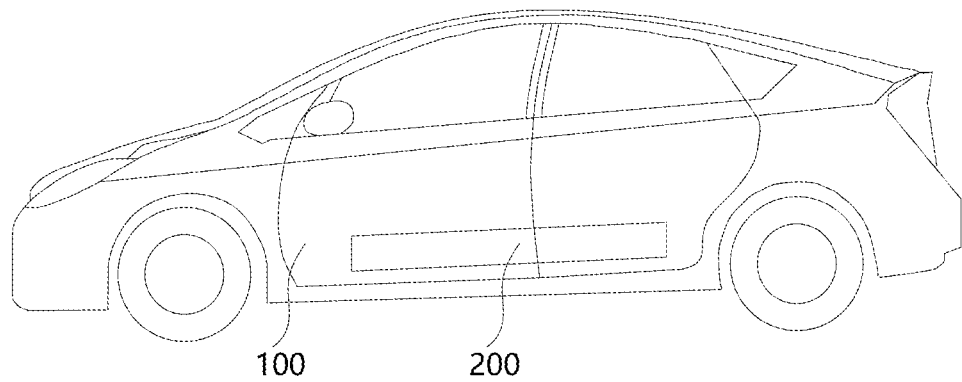
FIG. 1 is an outline schematic diagram of some embodiments of a vehicle adopting a battery of the present disclosure.

In order to make the objectives, technical solutions, and advantages of the embodiments of the present disclosure clearer, a clear and complete description of the technical solutions of the embodiments of the present disclosure will be given below in combination with accompanying drawings in the embodiments of the present disclosure. The described embodiments are only a part but not all of the embodiments of the present disclosure. Based upon the embodiments of the present disclosure, all of the other embodiments obtained by those skilled in the art without any creative effort shall all fall within the protection scope of the present disclosure.

Unless otherwise defined, all the technical and scientific terms used in the text have the same meanings as those understood by persons skilled in the art in the technical field of the present disclosure; in the present text, the terms used in the applied description are merely for the purpose of describing specific embodiments, rather than for limiting the present disclosure; the terms "including" and "having" and any variation thereof in the description and claims and the above brief description of the drawings of the present disclosure intend to encompass non-exclusive inclusions. The terms such as "first" and "second" in the description and claims or the above drawings of the present disclosure are used for distinguishing different objects, rather than for describing a particular sequence or primary or secondary relationship.

The mentioning of "embodiment" in the present text means that specific characteristics, structures or properties described in combination with embodiments can be included in at least one embodiment of the present disclosure. The occurrence of this phrase in various positions of the description does not necessarily refer to the same embodiment, nor refer to independent or alternative embodiment which is mutually exclusive with the other embodiments. Those skilled in the art can explicitly and implicitly understand that, the embodiments described in the text can be combined with other embodiments.

The term "and/or" in the text merely describes an incidence relationship of associated objects, and represents the existence of three relationships, for example, A and/or B can represent: A exists alone, A and B exist simultaneously, B exists alone. In addition, the character "/" in the text generally represents that the front and rear associated objects are of an "or" relationship.

The term "a plurality of" in the present disclosure refers to more than two (including two), similarly, "a plurality of groups" refers to more than two groups (including two groups), and "a plurality of pieces" refers to more than two pieces (including two pieces).

The present disclosure provides an electrode assembly and a related battery, device, manufacturing method and manufacturing device, and overcomes the above problem or at least partially solves the above problem.

The electrode assembly of the embodiments of the present disclosure controls the size by which the negative active substance area exceeds the positive active substance area, thereby reducing the reserved size of the negative active substance area, reserving space for increasing the area of the positive active substance area and the negative active substance area, and further lowering cost and improving the energy density of the electrode assembly.

The electrode assembly and the manufacturing method thereof, the battery, the battery module and the battery pack described in the embodiments of the present disclosure are all applicable to various devices using batteries, for example, mobile phones, portable devices, notebook computers, battery cars, electric vehicles, ships, space vehicles, electric toys, and electric tools, etc., for example, the space vehicles include airplanes, rockets, space shuttles, and spacecrafts, etc., the electric toys include fixed or mobile electric toys, for example, game machines, electric vehicle toys, electric ship toys, electric airplane toys, etc., the electric tools include metal cutting electric tools, grinding electric tools, assembly electric tools and electric tools used in railways, for example, electric drills, electric grinders, electric wrenches, electric screw drivers, electric hammers, electric impact drills, concrete vibrators and electric planers.

The electrode assembly and the manufacturing method thereof, the battery, the battery module and the battery pack described in the embodiments of the present disclosure are not only applicable to the devices described above, but also applicable to all the devices using batteries, however, to facilitate description, electric vehicles are taken as an example for illustration in the following embodiments.

For example, FIG. 1 is a structural schematic diagram of a vehicle 100 of an embodiment of the present disclosure. The vehicle 100 can be an oil-fueled vehicle, a gas vehicle or a new-energy vehicle, and the new-energy vehicle can be a battery electric vehicle, a hybrid electric vehicle or an extended range vehicle. A battery pack 200 can be arranged inside the vehicle 100, for example, the battery pack 200 can be arranged at the bottom or the front or rear end of the vehicle 100. The battery pack 200 can be used for the power supply of the vehicle 100, for example, the battery pack 200 can serve as an operating power supply of the vehicle 100, and serve as a circuit system of the vehicle 100, for example, the battery pack 200 can satisfy power demands of the vehicle 100 during starting, navigation and operation of the vehicle 100. In another embodiment of the present disclosure, the battery pack 200 can not only serve as an operational power supply of the vehicle 100, but also serve as a driving power supply of the vehicle 100, to substitute or partially substitute fuel oil or natural gas to provide driving power for the vehicle 100.

Figure 2:
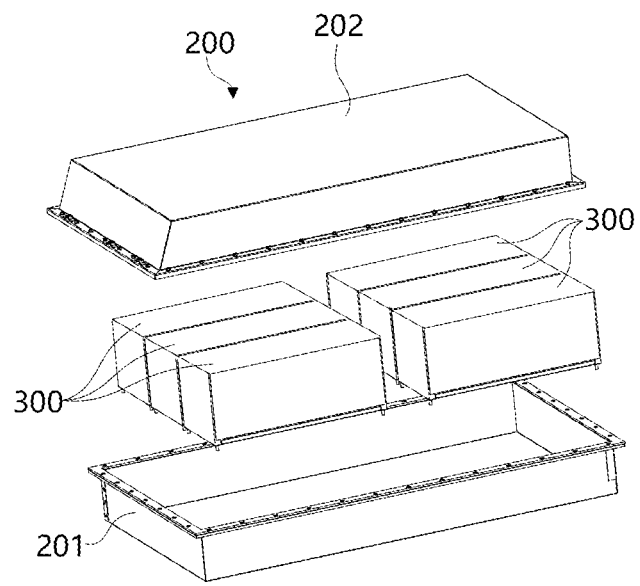
FIG. 2 is a structural schematic diagram of some embodiments of a battery pack of the present disclosure.

To satisfy different requirements of electricity use, the battery pack 200 can include one battery module or a plurality of battery modules, wherein the plurality of battery modules can be connected in series or in parallel or in series and parallel, and the connection in series and parallel refers to a combination of series connection and parallel connection. For example, FIG. 2 is a structural schematic diagram of a battery pack 200 of another embodiment of the present disclosure. The battery pack 200 includes a first housing 201, a second housing 202 and a plurality of battery modules 300, wherein the shapes of the first housing 201 and the second housing 202 are determined according to the combined shapes of the plurality of battery modules 300, the first housing 201 and the second housing 202 are both provided with an opening, for example, the first housing 201 and the second housing 202 can both be hollow cuboids with only one surface being an opening surface respectively, that is, the surface has no housing wall, such that the inside and the outside of the housing are communicated, the first housing 201 and the second housing 202 are buckled with each other at the opening to form a closed housing of the battery pack 200, and after the plurality of battery modules 300 are connected in parallel or connected in series or connected in series and parallel, the plurality of battery modules 300 are placed in the housing formed after the first housing 201 is buckled with the second housing 202.

In another embodiment of the present disclosure, when the battery pack 200 includes a battery module 300, the battery module 300 is placed in the housing formed after the first housing 201 is buckled with the second housing 202.

The electricity generated through the one or more battery modules 300 penetrates through the housing through a conducting mechanism (not shown in the figure) and is led out.

Figure 3:
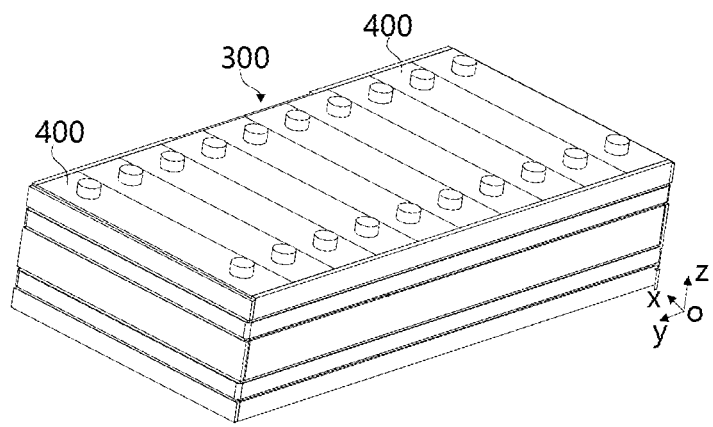
FIG. 3 is a structural schematic diagram of some embodiments of a battery module of the present disclosure.

According to different power demands, the battery module 300 can include one or more batteries, as shown in FIG. 3, the battery module 300 includes a plurality of batteries 400, and the plurality of batteries 400 can be connected through a manner of series connection, parallel connection or series and parallel connection, to realize a large capacity or power. For example, the battery 400 includes, but is not limited to, a lithium ion secondary battery, a lithium ion primary battery, a lithium sulfur battery, a sodium lithium ion battery, or a magnesium ion battery. The battery 400 can be cylindrical, flat, rectangle or of other shapes.

Figure 4:
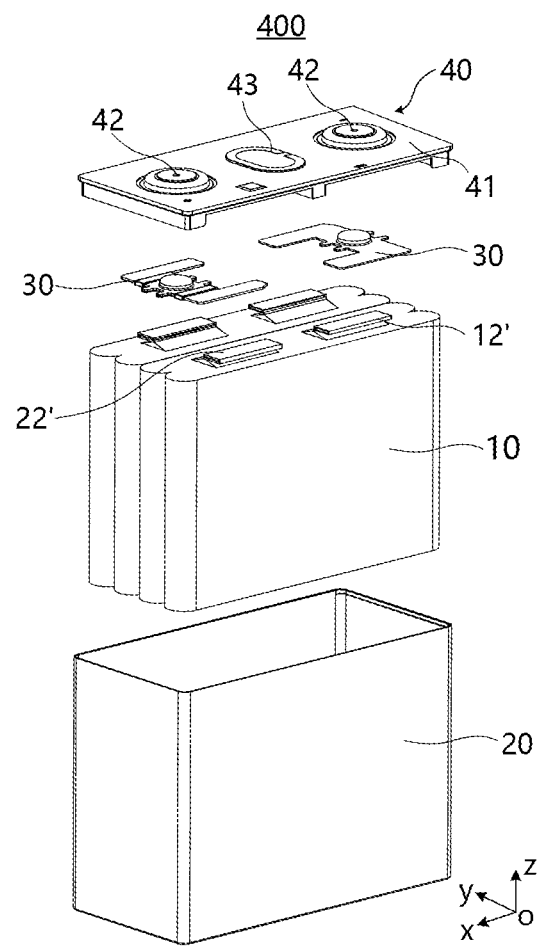
FIG. 4 is an exploded view of some embodiments of a battery of the present disclosure.

In another embodiment of the present disclosure, the plurality of batteries 400 can be superimposed together, and the plurality of batteries 400 can be connected in series, in parallel or in series and parallel. In another embodiment of the present disclosure, each battery 400 can be square, cylindrical or of other shapes. For example, FIG. 4 is a structural schematic diagram of a battery 400 of another embodiment of the present disclosure, the battery 400 includes one or more electrode assemblies 10, a housing 20 and an end cover assembly 40. The shape of the housing 20 can be determined according to the combined shapes of one or more electrode assemblies 10, for example, the housing 20 can be a hollow cuboid or cube or cylinder, moreover, one of the surfaces of the housing 20 is provided with an opening, such that one or more electrode assemblies 10 can be placed in the housing 20, for example, when the housing 20 is a hollow cuboid or cube, one of the planes of the housing 20 is an opening surface, that is, the plane has no housing wall, such that the inside and the outside of the housing 20 are communicated, when the housing 20 can be a hollow cylinder, the circular side face of the housing 20 is an opening surface, that is, the circular side face has no housing wall, such that the inside and the outside of the housing 20 are communicated. The end cover assembly 40 is connected with the housing 20 at the opening of the housing 20 to form a closed housing to place the battery 400, and the housing 20 is internally filled with electrolyte.

The end cover assembly 40 includes an end cover 41 and two terminals 42, the end cover 41 is basically flat, two terminals 42 are arranged on the flat surface of the end cover 41 and penetrate through the flat surface of the end cover 41, the two terminals 42 are respectively a positive terminal and a negative terminal, each terminal 42 is correspondingly provided with a collector member 30, and the collector member 30 is arranged between the end cover 41 and the electrode assembly 10.

For example, as shown in FIG. 4, each electrode assembly 10 is provided with a positive tab 12' and a negative tab 22', the positive tab 12' of one or more electrode assemblies 10 is connected with a positive terminal through a collector member 30, and the negative tab 22' of one or more electrode assemblies 10 is connected with the negative terminal through another collector member 30.

In another embodiment of the present disclosure, the flat surface of the end cover 41 can further be provided with an anti-explosion valve 43, the anti-explosion valve 43 can be a part of the flat surface of the end cover 41, and can also be welded with the flat surface of the end cover 41. For example, the anti-explosion valve 43 has a nick, and the depth of the nick is smaller than the thickness of other areas, except the nick, of the anti-explosion valve 43, to achieve the purpose of not penetrating through the anti-explosion valve 43, that is, under normal states, the anti-explosion valve 43 is in sealed combination with the end cover 41, the end cover assembly 40 is connected with the housing 20 at the opening of the housing 20 through the end cover 41 to form a housing for placing the battery 400, and the space formed by the housing is sealed and airtight. In the housing, when the battery 400 produces too much gas, and when the gas expands such that the air pressure in the housing rises to exceed a preset value, the anti-explosion valve 43 is cracked at the nick and the inside and the outside of the housing are communicated, and gas is released outwards through the cracking point of the anti-explosion valve 43, to further avoid explosion.

Figure 5:
FIG. 5 is a side view of some embodiments after an electrode assembly of the present disclosure is flattened.

In the battery 400, according to actual use demands, a single or a plurality of electrode assemblies 10 can be arranged, and as shown in FIG. 4, the battery 400 is internally provided with at least two independent electrode assemblies 10. In another embodiment of the present disclosure, as shown in FIG. 5, the electrode assembly 10 can include: at least one positive electrode plate 1 and at least one negative electrode plate 2, the at least one positive electrode plate 1 and the at least one negative electrode plate 2 are wound around the winding axis K to form a winding structure, wherein in the winding structure, the positive electrode plate 1 of the at least one positive electrode plate 1 and the negative electrode plate 2 of the at least one negative electrode plate 2 are arranged in a superimposing manner along a direction vertical to the winding axis K.

The number of the at least one positive electrode plate 1 and the at least one negative electrode plate 2 can be the same and can also be different, for example, the electrode assembly 10 includes 1, 2, 3 or 4 positive electrode plates 1 and 1, 2, 3 or 4 negative electrode plates 2. In some embodiments, the sum of the number of all the positive electrode plates 1 and all the negative electrode plates 2 is greater than or equal to 3. For example, the electrode assembly 10 includes one positive electrode plate 1 and two negative electrode plates 2, or includes two positive electrode plates 1 and one negative electrode plate 2, or includes two positive electrode plates 1 and two negative electrode plates 2, or includes one positive electrode plate 1 and three negative electrode plates 2, or includes three positive electrode plates 1 and one negative electrode plates 2, or includes three positive electrode plates 1 and three negative electrode plates 2.

In another embodiment of the present disclosure, the shape of each positive electrode plate 1 is basically the same as the shape of each negative electrode plate 2, for example, after the winding structure is flattened, the positive electrode plate 1 and the negative electrode plate 2 are basically strip-shaped, for example, the positive electrode plate 1 and the negative electrode plate 2 can be strip-shaped with a length of 5-20 m. The length difference between the positive electrode plate 1 and the negative electrode plate 2 is within a preset range, and the width sizes are basically the same. After at least one positive electrode plate 1 and at least one negative electrode plate 2 are superimposed, a winding structure can be obtained when the one positive electrode plate 1 and at least one negative electrode plate 2 are wound along a strip direction. The winding structure has a winding axis K, and the superimposing surface in which the at least one positive electrode plate 1 is superimposed with the at least one negative electrode plate 2 is basically in parallel with the winding axis K.

In another embodiment of the present disclosure, the at least one positive electrode plate 1 and at least one negative electrode plate 2 can be superimposed in a plurality of forms, for example, when at least one positive electrode plate 1 is two or more positive electrode plates 1 and at least one negative electrode plate 2 is two or more negative electrode plates 2, after the winding structure is flattened, one positive electrode plate 1 and one negative electrode plate 2 can be superimposed alternately in sequence, every two or more positive electrode plates 1 and one negative electrode plate 2 can be superimposed alternately in sequence, and one positive electrode plate 1 and every two or more negative electrode plates 2 can be superimposed alternately in sequence. The superimposing between the plurality of positive electrode plates 1 and the plurality of negative electrode plates 2 can also be understood as that at least one negative electrode plate 2 is included between every two adjacent positive electrode plates 1, or, at least one positive electrode plate 1 is included between every two adjacent negative electrode plates 2.

When the at least one positive electrode plate 1 is superimposed with at least one negative electrode plate 2, a diaphragm 3 is further arranged between any adjacent one positive electrode plate 1 and one negative electrode plate 2, and the diaphragm 3 is configured to separate the adjacent positive electrode plate 1 from the negative electrode plate 2, such that the adjacent positive electrode plate and the negative electrode plate are not in short circuit with each other.

In another embodiment of the present disclosure, electrode plates of different polarities are adjacent to each other, that is, the positive electrode plate 1 being adjacent to the negative electrode plate 2 means that no other electrode plate but at least one layer of diaphragm 3 exists between the positive electrode plate 1 and the negative electrode plate 2, for example, no other positive electrode plate 1 or negative electrode plate 2 exists between the positive electrode plate 1 and the negative electrode plate 2, and can also be understood as that the positive electrode plate 1 and the negative electrode plate 2 are most directly adjacent to each other, for example, on the basis of one electrode plate with one polarity (for example, the positive electrode plate 1), the electrode plate with the polarity and the first layer of electrode plates with different polarities (for example, the negative electrode plate 2) adjacent to the electrode plate with the polarity are called adjacent electrode plates.

In another embodiment of the present disclosure, two electrode plates of the same polarity being adjacent means that only one electrode plate of other polarity exists between two electrode plates of the same polarity, for example, two positive electrode plates 1 being adjacent means that only one negative electrode plate 2 exists between two positive electrode plates 1, and two negative electrode plates 2 being adjacent means that only one positive electrode plate 1 exists between two negative electrode plates 2. In another embodiment of the present disclosure, when no other electrode plate of a different polarity exists between two electrode plates of the same polarity, the two electrode plates of the same polarity can be taken as one electrode plate.

In another embodiment of the present disclosure, when no other electrode plates of a different polarity and diaphragms exist between two or more electrode plates of the same polarity, the two electrode plates of the same polarity can be taken as one group of electrode plates, then during superimposing, the electrode plate group of the same polarity and another electrode plate group of a different polarity or a single electrode plate are superimposed alternately in sequence, for example, two or more positive electrode plates constitute a positive electrode plate group, and two or more negative electrode plates constitute a negative electrode plate group. The superimposing can be as follows: the positive electrode plate group and the negative electrode plate group are superimposed alternately in sequence, the positive electrode plate group and a single negative electrode plate are superimposed alternately in sequence, or, the negative electrode plate group and the single positive electrode plate are superimposed alternately in sequence.

Since the electrode plate group of the same polarity can be taken as one electrode plate, therefore, to facilitate description, one electrode plate described subsequently not only can be a single electrode plate, but also can be an electrode plate group composed of a plurality of electrode plates of the same polarity.

However, regardless of the superimposing manners, at least one layer of diaphragm 3 is arranged between adjacent electrode plates of different polarities.

In another embodiment of the present disclosure, the diaphragm 3 includes a diaphragm base layer and a functional layer, wherein the diaphragm base layer can be at least one selected from polypropylene, polyethylene, ethylene-propylene copolymer, and polybutylene terephthalate, and the functional layer can be a mixture layer of ceramic oxides and binder. In another embodiment of the present disclosure, after the winding structure is flattened, the diaphragm 3 is a thin film which exists separately, and is basically strip-shaped, for example, a strip shape with a length of 5-20 m. In another embodiment of the present disclosure, the diaphragm 3 is coated on the surface of the positive electrode plate 1 or the negative electrode plate 2, that is, the diaphragm 3 and the positive electrode plate 1 or the negative electrode plate 2 are of an integrated structure.

To facilitate description, one positive electrode plate 1 and one negative electrode plate 2 being superimposed alternately in sequence and one diaphragm 3 being arranged between adjacent positive electrode plate 1 and negative electrode plate 2 are taken as an example for illustration in the following embodiments. For example, FIG. 5 is a structural schematic diagram after a winding structure of an electrode assembly 10 in another embodiment of the present disclosure is flattened. The electrode assembly 10 includes: two positive electrode plates 1 and two negative electrode plates 2, before winding, each positive electrode plate 1 and each negative electrode plate 2 can both be of a strip structure, two positive electrode plates 1 and two negative electrode plates 2 are superimposed in the thickness direction of the electrode plate, and a diaphragm 3 is arranged between any adjacent positive electrode plate 1 and the negative electrode plate 2, that is, one positive electrode plate 1 and one negative electrode plate 2 are superimposed alternately in sequence, and a diaphragm 3 is arranged between adjacent positive electrode plate 1 and a negative electrode plate 2, the diaphragm 3 can not only be coated on the superimposing surface of the positive electrode plate 1 and the negative electrode plate 2, but also can be a separate diaphragm, and the superimposing plane in which two positive electrode plates 1 are superimposed with two negative electrode plates 2 is basically in parallel with the winding axis K of the winding structure of the electrode assembly 10.

Figure 6:
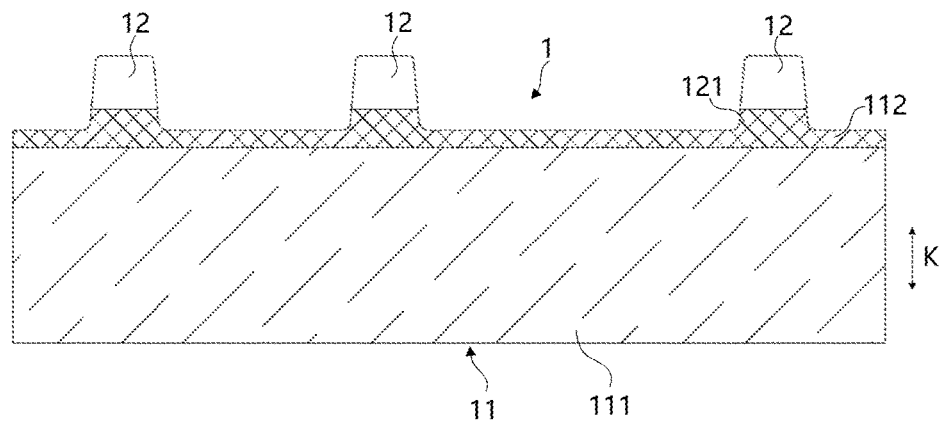
FIG. 6 is a structural schematic diagram of some embodiments of a positive electrode plate in an electrode assembly of the present disclosure.

The structure of the positive electrode plate 1 can be as shown in FIG. 6 which is a structural schematic diagram of a positive electrode plate 1 in another embodiment of the present disclosure. The positive electrode plate 1 includes a positive main body part 11 and at least one positive tab part 12 which extends outwards along the direction of the winding axis K from the positive main body part 11, at least part of the area, along the winding axis K, on the superimposing surface of the positive main body part 11 is a positive active substance area 111, the positive active substance area 111 can be coated with a positive active substance, for example, the positive active substance can be ternary materials, lithium manganate or lithium iron phosphate.

In another embodiment of the present disclosure, part of the area of the superimposing surface of the positive main body part 11 further includes a first insulating layer coating area 112, and the first insulating layer coating area 112 is arranged on a side, adjacent to the positive tab part 12, of the positive active substance area 111.

For example, the positive active substance area 111 and the first insulating layer coating area 112 are distributed on the superimposing surface of the positive main body part 11 along two end sides of the winding axis K, and the positive tab part 12 and the first insulating layer coating area 112 belong to the same end side of the positive main body part 11, for example, the positive tab part 12 extends towards the outer side of the positive main body part 11 from the first insulating layer coating area 112 along the direction of the winding axis K.

In another embodiment of the present disclosure, the positive active substance area 111 and the first insulating layer coating area 112 are distributed on the superimposing surface of the positive main body part 11 along two end sides of the winding axis K, this can also be understood as that the positive active substance area 111 and the first insulating layer coating area 112 are basically parallel areas on the superimposing surface of the positive main body part 11 and are distributed in two layers on the superimposing surface of the positive main body part 11 along the winding axis K, that is, the positive active substance area 111 and the first insulating layer coating area 112 are basically parallel and are distributed in two layers on the superimposing surface of the positive main body part 11 along the strip direction of the positive electrode plate 1.

In another embodiment of the present disclosure, the first insulating layer coating area 112 can be arranged at the connecting portion between the positive main body part 11 and the positive tab part 12, for example, the first insulating layer coating area 112 is arranged on the superimposing surface of the positive main body part 11 and at the part at which the positive main body 11 is connected with the positive tab part 12, to separate the surface of the positive tab part 12 and the positive active substance area 111. In another embodiment of the present disclosure, not only part of the area, connected with the positive tab part 12 which extends outwards, on the superimposing surface of the positive main body part 11 is provided with a first insulating layer coating area 112, but also part of the area, connected with the superimposing surface of the positive main body part 11, on the superimposing surface of the positive tab part 12 is further provided with a second insulating layer coating area 121, that is, the second insulating layer coating area 121 can cover a root area, adjacent to the positive main body part 11, of the positive tab part 12.

In another embodiment of the present disclosure, the surface of the first insulating layer coating area 112 is coated with insulating substances, and the insulating substances include inorganic fillers and binder. The inorganic fillers include at least one or more of boehmite, aluminum oxide, magnesium oxide, titanium dioxide, zirconium oxide, silicon dioxide, silicon carbide, boron carbide, calcium carbonate, aluminum silicate, calcium silicate, potassium titanate, and barium sulfate. The binder includes one or more of polyvinylidene fluoride, polyacrylonitrile, polyacrylic acid, polyacrylic ester, polyacrylate-acrylate, polyacrylonitrile-acrylic acid, and polyacrylonitrile-acrylic ester.

In another embodiment of the present disclosure, each positive electrode plate 1 can include one or two or more than two positive tab parts 12, when the positive electrode plate 1 includes two or more positive tab parts 12, all the positive tab parts 12 are arranged on the same side, along the winding axis K, of the positive electrode plate 1, for example, as shown in FIG. 6, the positive electrode plate 1 includes three positive tab parts 12, arranged on the same side along the winding axis K, on the positive electrode plate 1.

Figure 7:
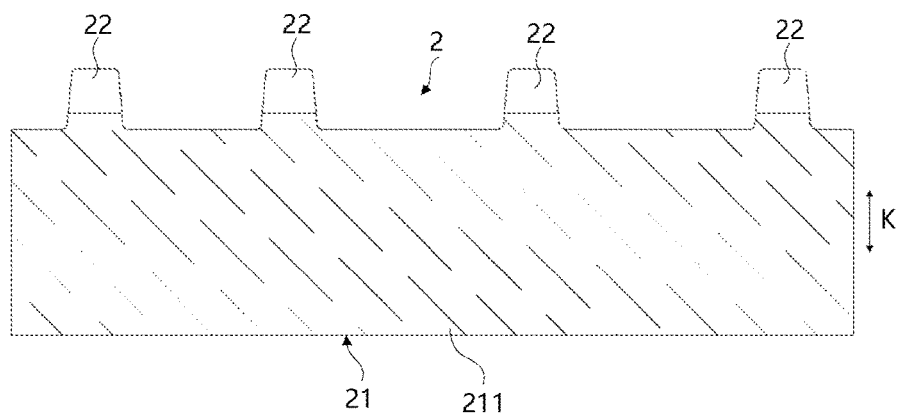
FIG. 7 is a structural schematic diagram of some embodiments of a negative electrode plate in an electrode assembly of the present disclosure.

The structure of the negative electrode plate 2 can be as shown in FIG. 7 which is a structural schematic diagram of a negative electrode plate 2 of another embodiment of the present disclosure, the negative electrode plate 2 includes a negative main body part 21 and a negative tab part 22 which extends outwards from the negative main body part 21 along the direction of the winding axis K, at least part of the area, along the winding axis K, on the superimposing surface of the negative main body part 21 is a negative active substance area 211, the negative active substance area 211 is configured to coat the negative active substance, and the negative active substance can be graphite or silicon.

In another embodiment of the present disclosure, not only part of the area of the superimposing surface of the negative main body part 21 is provided with a negative active substance area 211, but also part of the area, connected with the superimposing surface of the negative main body part 21, on the superimposing surface of the negative tab part 22 is provided with a negative active substance area 211, that is, part of the area of the negative tab part 22 is the negative active substance area 211, for example, the negative active substance area 211 can cover the root area, adjacent to the negative main body part 21, of the negative tab part 22.

In another embodiment of the present disclosure, as shown in FIG. 7, the negative active substance area 211 covers the whole superimposing surface, along the winding axis K, of the negative main body part 21.

In another embodiment of the present disclosure, when the positive electrode plate 1 and the negative electrode plate 2 are superimposed with each other, that is, in the winding structure, the two ends, along the winding axis K, of the negative active substance area 211 of the negative electrode plate 2 both exceed the corresponding ends of the positive active substance area 111 of the adjacent positive electrode plate 1.

In some embodiments, two ends, along the winding axis K, of the negative active substance area 211 both exceed corresponding ends of the adjacent positive active substance area 111 by a range of 0.2 mm to 5 mm, for example, 0.2 mm, 0.5 mm, 0.8 mm, 1 mm, 1.5 mm, 2 mm, 2.5 mm, 3 mm, 3.5 mm, 4 mm, 4.5 mm or 5 mm, etc. Two ends, along the winding axis K, of the negative active substance area 211 can exceed corresponding ends of the positive active substance area 111 by the same size or by different sizes.

Figure 8:
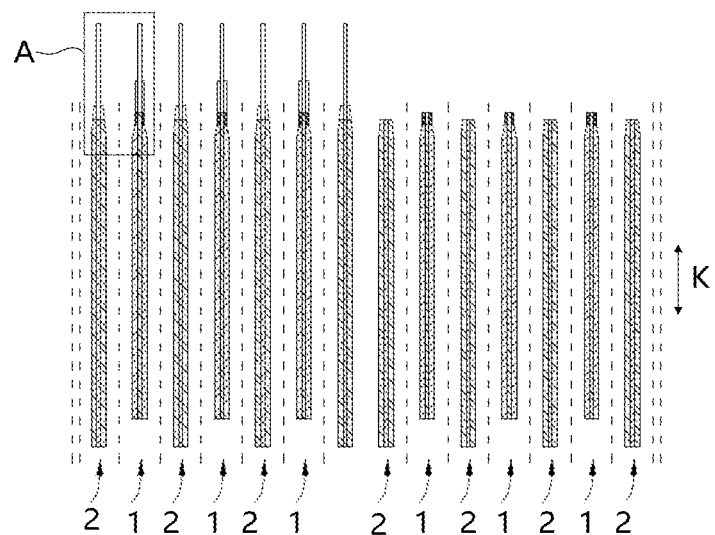
FIG. 8 is a side view of some embodiments in which positive electrode plates and negative electrode plates are arranged alternately in an electrode assembly of the present disclosure.
Figure 9:
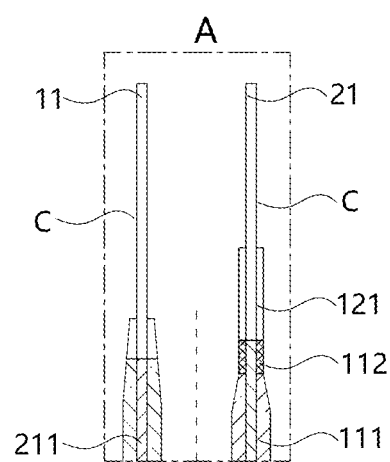
FIG. 9 is an enlarged view of part B of FIG. 8.

When the plurality of positive electrode plates 1 and the plurality of negative electrode plates 2 are superimposed with each other, the obtained sectional views of the winding structure can be as shown in FIG. 8 and FIG. 9, the superimposing manner between at least one positive electrode plate 1 and at least one negative electrode plate 2 is that one positive electrode plate 1 and one negative electrode plate 2 are superimposed alternately in sequence, and adjacent positive electrode plate 1 and the negative electrode plate 2 are separated through a diaphragm 3, wherein K is the winding axis K of the winding structure.

In combination with FIG. 6 to FIG. 9, to avoid the phenomenon that after a positive tab part 12 is cut out on the positive electrode plate 1, the edge of the positive main body part 11 is prone to have burrs, and the burrs may possibly pierce the diaphragm 3, which leads to short circuit of the positive electrode plate 1 and the negative electrode plate 2, the area, adjacent to the positive tab part 12, of the positive main body part 11 of the present embodiment may be set to be an empty foil area C, and the empty foil area C goes beyond the edge of the negative main body part 21 along the direction of the winding axis K, thereby avoiding the risk of contact between burrs at the edge of the positive main body part 11 and the negative electrode plate 2 after the burrs pierce the diaphragm 3 at this time, and further avoiding the problem of short circuit of the positive electrode plate 1 and the negative electrode plate 2 since the gap between the empty foil area and the protruding amount is large and metal scraps easily fall into the gap.

In the present embodiment, a first insulating layer coating area 112 is arranged on the positive main body part 11, and the first end, adjacent to the negative tab part 22 along the direction of the winding axis K, of the negative main body part 21 is arranged in the first insulating layer coating area 112, thereby reducing the risk of short circuit of the positive electrode plate 1 and the negative electrode plate 2 after metal scraps pierce the diaphragm 3 on the basis of satisfying that the negative active substance area 211 exceeds the adjacent positive active substance area 111 along the winding axis K.

In another embodiment of the present disclosure, the second end, far away from the negative tab part 22 along the direction of the winding axis K, of the negative main body part 21 of the negative electrode plate 2 exceeds the positive active substance area 111 of the positive electrode plate 1.

In another embodiment of the present disclosure, the area, far away from the negative tab part 22 along the direction of the winding axis K, of the negative main body part 21 of the negative electrode plate 2 is set to be an empty foil area.

In another embodiment of the present disclosure, part of the area, connected with the superimposing surface of the positive main body part 11, on the superimposing surface of the positive tab part 12 is provided with a second insulating layer coating area 121, thereby effectively reducing the risk of short circuit caused by contact between the root area of the positive tab part 12 and the negative active substance area 211.

After the electrode assembly 10 is wound and molded, all the positive tab parts 12 are superimposed together to form a positive tab of the electrode assembly 10, and are welded to the corresponding collector members. In addition, to avoid the risk of short circuit caused by the following: after welding, non-welded areas of a plurality of positive tab parts 12 are in a dispersed state, meanwhile, since the tab part is thin, in the configuration process of the electrode assembly 10, the positive tab part 12 is easily deformed and is pressed between the positive electrode plate 1 and the negative electrode plate 2, a first insulating layer coating area 112 is arranged in the positive electrode plate 1 of the present embodiment, to play an effect of insulation protection. Even if the positive tab part 12 is inserted between the positive electrode plate 1 and the negative electrode plate 2, the first insulating layer coating area 112 can effective separate the positive electrode plate 1 from the negative electrode plate 2, thereby reducing the risk of short circuit and improving the safety performance of batteries.

In another embodiment of the present disclosure, to retain part of the negative active substance at the root part of the negative tab part 22 of the negative electrode plate 2, during cutting, a cutter can directly act on the negative active substance, to reduce burrs at the cutting point, and reduce the risk that the diaphragm 3 is pierced.

In another embodiment of the present disclosure, when the positive electrode plate 1 and the negative electrode plate 2 are superimposed, that is, in the winding structure, the positive tab part 12 of the positive electrode plate 1 and the negative tab part 22 of the negative electrode plate 2 can not only be arranged on the same side along the direction of the winding axis K of the winding structure, but also can be arranged on different sides.

For example, each positive electrode plate 1 can include one or two or more than two positive tab parts 12, when the positive electrode plate 1 includes two or more positive tab parts 12, all the positive tab parts 12 are arranged on the same side, along the winding axis K, of the positive electrode plate 1. Each negative electrode plate 2 can include one or two or more than two negative tab parts 22, when the negative electrode plate 2 includes two or more than two negative tab parts 22, all the negative tab parts 22 are arranged on the same side, along the winding axis K, of the negative electrode plate 2.

Figure 10:
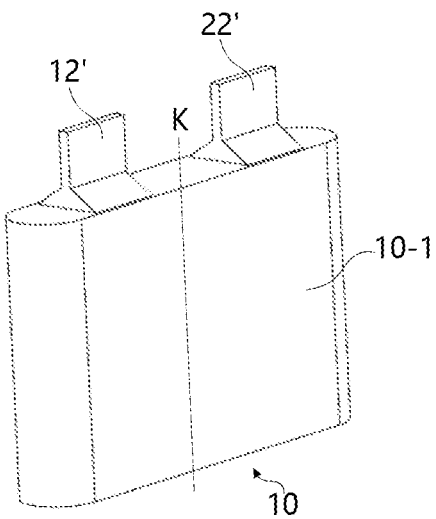
FIG. 10 is a structural schematic diagram of some embodiments in which a positive tab and a negative tab of the present disclosure are arranged at the same end of the main body part along a winding axis.

In another embodiment of the present disclosure, as shown in FIG. 10, all the positive tab parts 12 and all the negative tab parts 22 are arranged on the same side, along the winding axis K, of the electrode assembly 10-1.

Figure 11:
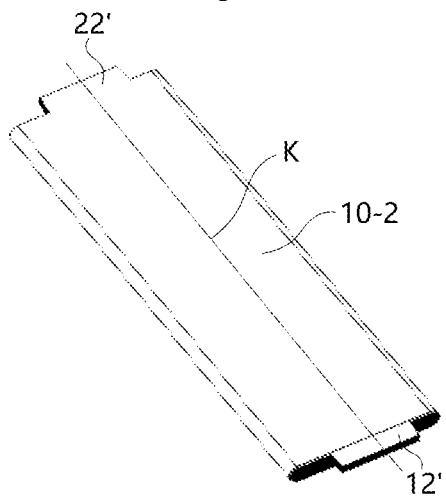
FIG. 11 is a structural schematic diagram of some embodiments in which a positive tab and a negative tab of the present disclosure are arranged at different ends of the main body part along a winding axis.

In another embodiment of the present disclosure, as shown in FIG. 11, all the positive tab parts 12 and all the negative tab parts 22 are arranged on different sides, along the winding axis K, of the electrode assembly 10-2.

For example, the electrode assembly 10 includes at least one positive electrode plate 1 and at least one negative electrode plate 2, the at least one positive electrode plate 1 and the at least one negative electrode plate 2 are wound around the winding axis K to form a winding structure, all the positive tab parts of all the positive electrode plates 1 are basically overlapped, all the negative tab parts 22 of all the negative electrode plates 2 are basically overlapped, and all the positive tab parts of all the positive electrode plates 1 and all the negative tab parts 22 of all the negative electrode plates 2 are respectively arranged on two sides, along the direction of the winding axis K, of the winding structure, or all the positive tab parts 12 and all the negative tab parts 22 are arranged on the same side, along the winding axis K, of the electrode assembly 10.

In another embodiment of the present disclosure, when the number of at least one positive electrode plate 1 is greater than or equal to 2, the positions of the first winding tail ends E of at least two positive electrode plates 1 are different, for example, the positions of the first winding tail ends E of all the positive electrode plates 1 are different from each other; and/or, when the number of the at least one negative electrode plate 2 is greater than or equal to 2, the positions of the second winding tail ends E' of at least two negative electrode plates 2 are different, for example, the positions of the second winding tail ends E' of all the negative electrode plates 2 are different.

The electrode assembly 10 will expand during the using process, and will exert an acting force on the housing 20 after the electrode assembly 10 expands, meanwhile, the housing 20 exerts a counter-acting force onto the electrode assembly 10. As to the electrode assembly 10 of the present disclosure, the positions of the winding tail ends of at least two positive electrode plates 1 are set to be different, and/or the positions of the winding tail ends of at least two negative electrode plates 2 are set to be different, that is, the winding tail ends of at least two positive electrode plates 1 are arranged in a staggered manner in the circumferential direction of the winding structure, and/or the winding tail ends of at least two negative electrode plates 2 are arranged in a staggered manner in the circumferential direction of the winding structure. Such a structure can prevent the formation of a thick step after the winding tail ends of the plurality of positive electrode plates 1 or the plurality of negative electrode plates 2 are superimposed, when the outer layer of the winding structure is subjected to the counter-acting force of the housing 20, the problem of concentration of stress at the winding tail end of the electrode plate can be alleviated, such that the winding structure 10' is subjected to a uniform stress at different circumferential positions, thereby preventing great deformation of the winding structure or preventing falling off of active substance at partial areas with a large stress, and improving the operating performance and reliability of the battery after long-term use.

In another embodiment of the present disclosure, when the number of the at least one positive electrode plate 1 is greater than or equal to 2, the positions of the first winding initial ends S of at least two positive electrode plates 1 are different, for example, the positions of the first winding initial ends S of all the positive electrode plates 1 are different; and/or, when the number of the at least one negative electrode plate 2 is greater than or equal to 2, the positions of the second winding initial ends S' of at least two negative electrode plates 2 are different, for example, the positions of the second winding initial ends S' of all the negative electrode plates 2 are different.

The electrode assembly 10 will expand during the using process, as to the electrode assembly 10 of the present disclosure, the positions of the first winding initial ends S of at least two positive electrode plates 1 are set to be different, and/or the positions of the winding initial ends S' of at least two negative electrode plates 2 are set to be different, that is, the first winding initial ends S of at least two positive electrode plates 1 are arranged in a staggered manner in the circumferential direction of the winding structure, and/or the second winding initial ends S' of at least two negative electrode plates 2 are arranged in a staggered manner in the circumferential direction of the winding structure, such that the positions of the winding initial ends of the positive electrode plate 1 and/or the negative electrode plate 2 are different, and the formation of a thick step at the winding initial ends of the plurality of positive electrode plates 1 or the plurality of negative electrode plates 2 can be prevented, the problem of concentration of stress at the winding initial ends of the electrode plates can be alleviated, such that the winding structure is subjected to a uniform stress at different circumferential positions, thereby preventing great deformation of the winding structure or preventing falling off of active substance at partial areas with a large stress, and improving the operating performance and reliability of the battery after long-term use.

In another embodiment of the present disclosure, in different radial directions of the winding structure, the difference of the number of layers of electrode plates does not exceed the number of preset layers. For example, the number of preset layers is smaller than or equal to the sum of the number of the plurality of positive electrode plates 1 and the plurality of negative electrode plates 2, for example, after two positive electrode plates 1 and two negative electrode plates 2 are wound, in one of the radial directions of the winding structure, the number of layers of electrode plates (including all the positive electrode plates 1 and negative electrode plates 2) is 8, in another radial direction of the winding structure, the number of the layers of electrode plates is 8 to the minimum, and 12 to the maximum, that is, the number of preset layers is smaller than or equal to the sum of the number of two positive electrode plates 1 and two negative electrode plates 2, wherein the sum is 4.

When the electrode assembly 10 expands and is in contact with the housing 20, the housing 20 will exert a counteracting force onto the electrode assembly 10, when the difference of number of layers of electrode plates does not exceed the number of preset layers in different radial directions of the winding structure, the stress on the electrode assembly 10 at each point of the circumferential direction is more uniform, thereby preventing larger difference of performances at various points of the electrode assembly 10 in the using process. For example, two positive electrode plates 1 are arranged, two negative electrode plates 2 are arranged, the number of preset layers is smaller than or equal to four, the smaller the difference of the number of layers of the electrode plates is, the more uniform the stress on the electrode assembly 10 at each point of the circumferential direction of the winding structure is.

In another embodiment of the present disclosure, the outermost layer and the innermost layer of the winding structure are both negative electrode plates 2.

The outermost layer and the innermost layer of the winding structure are both negative electrode plates 2. The materials of the positive active substance in the positive electrode plate 1 are generally ternary materials, lithium manganate or lithium iron phosphate and the like, the materials of the negative active substance in the negative electrode plate 2 are generally graphite or silicon, since the material of the positive active substance is more expensive than the material of the negative active material, therefore, the outermost layer and the innermost layer of the winding structure are both coated by the negative electrode plates 2, then the positive active substance of the positive electrode plate 1 can be sufficiently utilized, thereby not only improving the energy utilization ratio of the winding structure, but also reducing the difficulty in manufacturing process of the electrode assembly 10.

Optionally, at least one of the outermost layer and the innermost layer of the winding structure adopts a positive electrode plate 1, to reduce the manufacturing cost of the electrode assembly 10, for the positive electrode plate 1 arranged at the outermost layer or the innermost layer, positive active substance does not need to be coated on the surface, far away from the negative electrode plate 2, of the positive electrode plate 1.

In summary, in the using process of the electrode assembly 10, the lithium ions of the positive active substance area 111 of each positive electrode plate 1 penetrates through the diaphragm 3 and is embedded into the negative active substance area 211 of the adjacent negative electrode plate 2, since two ends, along the winding axis K, of the negative active substance area 211 both exceed the corresponding ends of the adjacent positive active substance area 111, then the lithium ions are ensured to be embedded into the negative active substance area 211 as far as possible, the risk of lithium precipitation is reduced, and the positive active substance of the positive active substance area 111 can sufficiently play its role.

In addition, when the electrode assembly 10 includes the plurality of positive electrode plates 1 or the plurality of negative electrode plates 2, since the plurality of positive electrode plates 1 or the plurality of negative electrode plates 2 are wound simultaneously, therefore, compared with the winding of the positive electrode plates 1 with the same length after the plurality of positive electrode plates 1 are connected or the negative electrode plates 2 with the same length after the plurality of negative electrode plates 2 are connected, the winding efficiency of the electrode assembly 10 of the present embodiment is obviously improved. For example, when one positive electrode plate 1 and one negative electrode plate 2 with the length of L are superimposed and wound, the winding length is L, the winding time is T, while in the embodiment of the present disclosure, the positive electrode plate 1 with the length of L is divided into the plurality of positive electrode plates 1 and the negative electrode plate 2 with the length of L is divided into M negative electrode plates 2, M is an integer greater than or equal to 2, for example, M positive electrode plates 1 and M negative electrode plates 2, while in the present embodiment, when other conditions (for example, the winding speed and the diameter of the winding core) are not changed, the winding distance of the M positive electrode plates 1 and M negative electrode plates 2 of the present embodiment is just L/M, and the winding time is T/M. Therefore, the number of winding turns of the electrode assembly 10 of the present embodiment is reduced, thereby being capable of improving the winding efficiency of the electrode assembly 10 exponentially, to satisfy production requirements.

Further, the number of winding turns of the electrode assembly 10 is reduced, then the winding errors during overlapping along the winding axis K in the winding process can be reduced, the size by which the negative active substance area 211 exceeds the positive active substance area 111 can be more easily controlled, thereby being capable of reducing the reserved size of the negative active substance area 211, reserving space for increasing the area of the positive active substance area 111 and the area of the negative active substance area 211, so as to lower cost and improve the energy density of the electrode assembly 10.

In addition, since the number of winding turns of the electrode assembly 10 is reduced, the winding tensile force exerted onto the electrode plate is more uniform, thereby being capable of reducing the bending degree of the bending part after the electrode plate is flattened, relieving wrinkling and deformation of the electrode plate, to improve the contact performance of the positive electrode plate 1 and the negative electrode plate 2, realize effective contact between the positive electrode plate 1 and the negative electrode plate 2, and further optimize the performance of the electrode assembly 10.

In addition, as to the electrode assembly 10, since the number of winding turns is reduced, the displacement amount of the positive tab part 12 after winding can be reduced, and connection with the collector member 30 is easy.

Further, as to the structure in which a tab is cut out on the positive electrode plate 1 and the negative electrode plate 2, after winding, a plurality of positive tab parts 12 are arranged in an overlapping manner, and a plurality of negative tab parts 22 are also arranged in an overlapping manner, to reduce the misplacement amount of a plurality of layers of positive tab parts 12 and the misplacement amount of a plurality of layers of negative tab parts 22, and to ensure the connecting area between each layer of tab and the collector member 30, and enhance the over-current capacity of the tab.

The electrode assembly 10 can include at least two positive electrode plates 1 and at least two negative electrode plates 2, however, to facilitate description, two positive electrode plates 1 and two negative electrode plates 2 are taken as an example for illustration in the following embodiments.

The external shape of the winding structure of the electrode assembly 10 can be a cylindrical shape, a flat shape, an ellipsoid shape, a cube shape, a cuboid shape or other arbitrary shapes. However, to facilitate description, the winding structure of the electrode assembly 10 being a flat shape and a cylinder shape is respectively taken as an example for illustration below.

Figure 12:
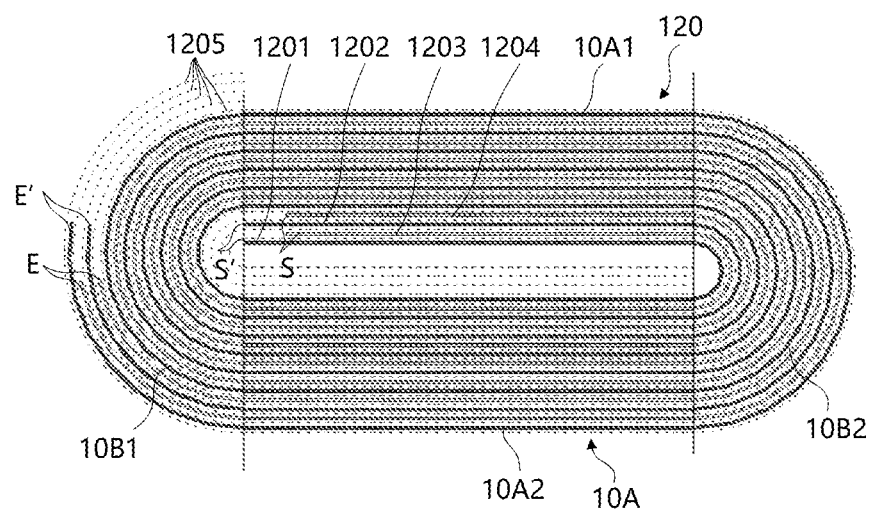
FIG. 12, FIG. 13, FIG. 14, FIG. 15 and FIG. 16 are respectively sectional views of a first embodiment, a second embodiment, a third embodiment, a fourth embodiment and a fifth embodiment of a flat electrode assembly of the present disclosure in a plane vertical to a winding axis.

FIG. 12 is a structural schematic diagram showing that a flat electrode assembly in another embodiment of the present disclosure is vertical to the cross section of the winding axis K. The electrode assembly 120 includes a first negative electrode plate 1201, a second negative electrode plate 1202, a first positive electrode plate 1203, a second positive electrode plate 1204 and a plurality of diaphragms 1205, wherein the first negative electrode plate 1201, the first positive electrode plate 1203, the second negative electrode plate 1202 and the second positive electrode plate 1204 are superimposed alternately in sequence, and the first negative electrode plate 1201 is separated from the first positive electrode plate 1203 through a diaphragm 1205, the first positive electrode plate 1203 is separated from the second negative electrode plate 1202 through another diaphragm 1205, the second negative electrode plate 1202 is separated from the second positive electrode plate 1204 through another diaphragm 1205, and all the first negative electrode plates 1201, the second negative electrode plates 1202, the first positive electrode plates 1203, the second positive electrode plates 1204 and the plurality of diaphragms 1205 are superimposed and then wound around the winding axis K to form a flat winding structure.

In the electrode assembly 120 in the present embodiment, as to the structures and positions of the positive tab parts of the first positive electrode plate 1203 and the second positive electrode plate 1204 and the negative tab parts of the first negative electrode plate 1201 and the second negative electrode plate 1202, please refer to the related contents of the positive tab parts and the negative tab parts described in the above embodiments of FIG. 6 to FIG. 11, which will not be repeated redundantly herein.

In the present embodiment, as to the following specific conditions: on different radial directions of the winding structure of the electrode assembly 120, that is, at different positions of the circumferential direction of the winding structure, the difference between the number of layers of electrode plates is no greater than the number of preset layers, please also refer to the related contents described in the above embodiments of FIG. 6 to FIG. 11, which will not be repeated redundantly herein.

As to the electrode assembly 120 of the present embodiment, the negative active substance area respectively included in the first negative electrode plate 1201 and the second negative electrode plate 1202 can be the same as the negative active substance area included in the negative electrode plate described in the above embodiments of FIG. 6 to FIG. 11, and the positive active substance area respectively included in the first positive electrode plate 1203 and the second positive electrode plate 1204 can be the same as the positive active substance area included in the positive electrode plate described in the above embodiments of FIG. 6 to FIG. 11, which will not be repeated redundantly herein.

In the present embodiment, two ends, along the winding axis K, of the negative active substance area of the first negative electrode plate 1201 both exceed the corresponding ends, along the winding axis K, of the positive active substance coating area of the adjacent first positive electrode plate 1203, two ends, along the winding axis K, of the negative active substance area of the second negative electrode plate 1202 both exceed the corresponding ends, along the winding axis K, of the positive active substance coating area of the adjacent first positive electrode plate 1203 and the second positive electrode plate 1204. Moreover, as to the specific conditions of two ends, along the winding axis K, of the negative active substance area of the first negative electrode plate 1201 and the second negative electrode plate 1202 and corresponding ends of the positive active substance area of the adjacent positive electrode plate, for example, the exceeded size, please refer to the content of the two ends, along the winding axis K, of the negative active substance area of the negative electrode plate 2 and corresponding ends of the positive active substance area of the adjacent positive electrode plate described in the embodiments of the above FIGS. 6-11, which will not be repeated redundantly herein.

In the winding structure, the innermost ring in the winding structure is a ring enclosed by the first negative electrode plates 1201, and the outermost ring of the winding structure is a ring enclosed by the second negative electrode plates 1202.

In the present embodiment, the winding structure of the electrode assembly 120 includes a flattening area 10A and turning areas 10B on two sides of the flattening area 10A, wherein the superimposing surface of the electrode plate in the flattening area 10A is a basically parallel plane and is basically in parallel with the winding axis, the plane herein is not exactly a plane, and a certain error is allowed. In a plane vertical to the winding axis K, the flattening area 10A includes a first sub-flattening area 10A1 and a second sub-flattening area 10A2 which are basically parallel and distributed symmetrically about the winding axis K, and the two turning areas 10B are respectively arranged in the first sub-flattening area 10A1 and the second sub-flattening area 10A2 to combine into two sides of the flattening area 10A.

The positions of the first winding initial ends S of the first positive electrode plate 1203 and the second positive electrode plate 1204 are the same, for example, the first winding initial ends S of the first positive electrode plate 1203 and the second positive electrode plate 1204 are both arranged in the sub-flattening area (for example, the first sub-flattening area 10A1) on the same side of the flattening area 10A, and the first winding initial ends S of the first positive electrode plate 1203 and the second positive electrode plate 1204 are flush.

The positions of the second winding initial ends S' of the first negative electrode plate 1201 and the second negative electrode plate 1202 are also the same, for example, the second winding initial ends S' of the first negative electrode plate 1201 and the second negative electrode plate 1202 are both arranged in the sub-flattening area (for example, the first sub-flattening area 10A1) on the same side of the first flattening area 10A, and the second winding initial ends S' of the first negative electrode plate 1201 and the second negative electrode plate 1202 are flush.

Along a reverse direction of the winding direction, the second winding initial end S' of the first negative electrode plate 1201 exceeds the first winding initial end S of the first positive electrode plate 1204. The second winding initial end S' of the second negative electrode plate 1202 exceeds the first winding initial end S of the second positive electrode plate 1203.

The positions of the first winding tail ends E of the first positive electrode plate 1203 and the second positive electrode plate 1204 are the same, for example, the first winding tail ends E of the first positive electrode plate 1203 and the second positive electrode plate 1204 are both arranged at the turning area (for example, the first turning area 10B1) on the same side, and the first winding tail ends E of the first positive electrode plate 1203 and the second positive electrode plate 1204 are flush.

The positions of the second winding tail ends E' of the first negative electrode plate 1201 and the second negative electrode plate 1202 are also the same, for example, the second winding tail ends E' of the first negative electrode plate 1201 and the second negative electrode plate 1202 are both arranged in the turning area (for example, the first turning area 10B1) on the same side, and are also arranged at the turning area (for example, the first turning area 10B1) of the same side as the first winding tail ends E of the first positive electrode plate 1203 and the second positive electrode plate 1204, and the second winding tail ends E' of the first negative electrode plate 1201 and the second negative electrode plate 1202 are flush.

Along a winding direction, the second winding tail end E' of the first negative electrode plate 1201 exceeds the first winding tail end E of the second positive electrode plate 1204. The second winding tail end E' of the second negative electrode plate 1202 exceeds the first winding tail end E of the first positive electrode plate 1203.

The winding structure of the electrode assembly described above can enable the length differences of the plurality of electrode plates before winding to be approximate, thereby being easy to wind.

Figure 13:
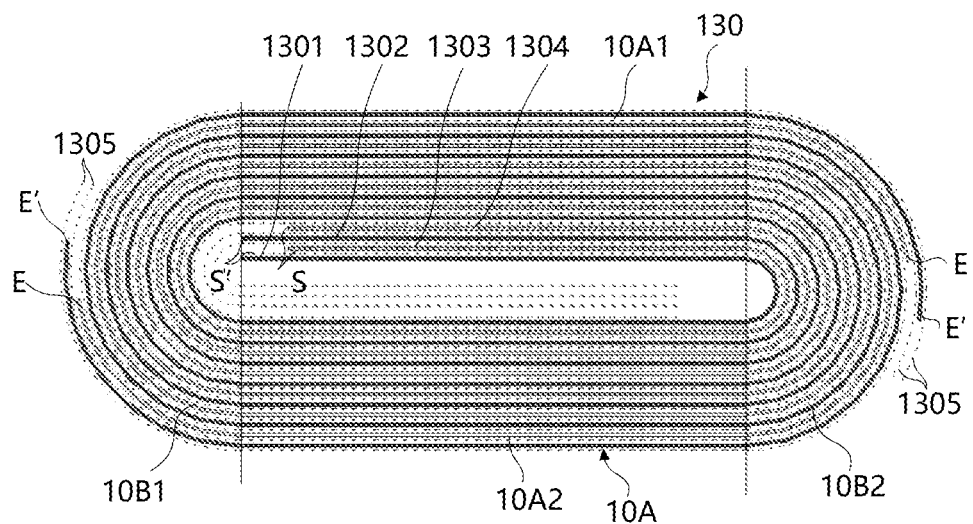

FIG. 13 is a structural schematic diagram showing that a flat electrode assembly is vertical to the cross section of the winding axis K in another embodiment of the present disclosure. The electrode assembly 130 includes a first negative electrode plate 1301, a second negative electrode plate 1302, a first positive electrode plate 1303, a second positive electrode plate 1304 and a plurality of diaphragms 1305, wherein the first negative electrode plate 1301, the first positive electrode plate 1303, the second negative electrode plate 1302 and the second positive electrode plate 1304 are superimposed alternately in sequence, and the first negative electrode plate 1301 is separated from the first positive electrode plate 1303 through a diaphragm 1305, the first positive electrode plate 1303 is separated from the second negative electrode plate 1302 through another diaphragm 1305, the second negative electrode plate 1302 is separated from the second positive electrode plate 1304 through another diaphragm 1305, and all the first negative electrode plates 1301, the second negative electrode plates 1302, the first positive electrode plates 1303, the second positive electrode plates 1304 and the plurality of diaphragms 1305 are superimposed and then wound around a winding axis K to form a flat winding structure.

In the present embodiment, two ends, along the winding axis K, of the negative active substance area of the first negative electrode plate 1301 both exceed the corresponding ends, along the winding axis K, of the positive active substance coating area of the adjacent first positive electrode plate 1303, two ends, along the winding axis K, of the negative active substance area of the second negative electrode plate 1302 both respectively exceed the corresponding ends, along the winding axis K, of the positive active substance coating area of the adjacent first positive electrode plate 1303 and the second positive electrode plate 1304. Moreover, as to the specific conditions of two ends, along the winding axis K, of the negative active substance area of the first negative electrode plate 1301 and the second negative electrode plate 1302 and corresponding ends of the positive active substance area of the adjacent positive electrode plate, for example, the exceeded size, please refer to the content of the two ends, along the winding axis K, of the negative active substance area of the negative electrode plate 2 and corresponding ends of the positive active substance area of the adjacent positive electrode plate described in the above embodiments of FIGS. 6-11, which will not be repeated redundantly herein.

The structure of the electrode assembly 130 of the present embodiment is basically similar to the structure of the electrode assembly described in the embodiment of FIG. 12, and the differences will be described below.

In the winding structure of the electrode assembly 130 of the present embodiment, the innermost ring in the winding structure is a ring enclosed by the first negative electrode plates 1301, and the outermost ring of the winding structure is a ring enclosed jointly by the first negative electrode plates 1301 and the second negative electrode plates 1302.

The first winding tail ends E of the first positive electrode plate 1303 and the second positive electrode plate 1304 are different, for example, the first winding tail ends E of the first positive electrode plate 1303 and the second positive electrode plate 1304 are respectively arranged at the second turning area 10B2 and the first turning area 10B1.

The second winding tail ends E' of the first negative electrode plate 1301 and the second negative electrode plate 1302 are also different, for example, the second winding tail ends E' of the first negative electrode plate 1301 and the second negative electrode plate 1302 are respectively arranged at the first turning area 10B1 and the second turning area 10B2.

Along a winding direction, the second winding tail end E' of the first negative electrode plate 1301 exceeds the first winding tail end E of the second positive electrode plate 1304. The second winding tail end E' of the second negative electrode plate 1302 exceeds the first winding tail end E of the first positive electrode plate 1303.

The winding structure of the electrode assembly described above can reduce the step formed by the first positive electrode plate 1303 and the second positive electrode plate 1304 at the first winding tail end E, and reduce the step formed by the first negative electrode plate 1301 and the second negative electrode plate 1302 at the second winding tail end E', so as to reduce local stress exerted onto the electrode plate at the winding tail end after the electrode assembly is in contact with the housing when the electrode assembly expands, prevent cracking of the electrode plate or falling off of the active substance, and improve the reliability of long-term operation of the electrode assembly.

Figure 14:
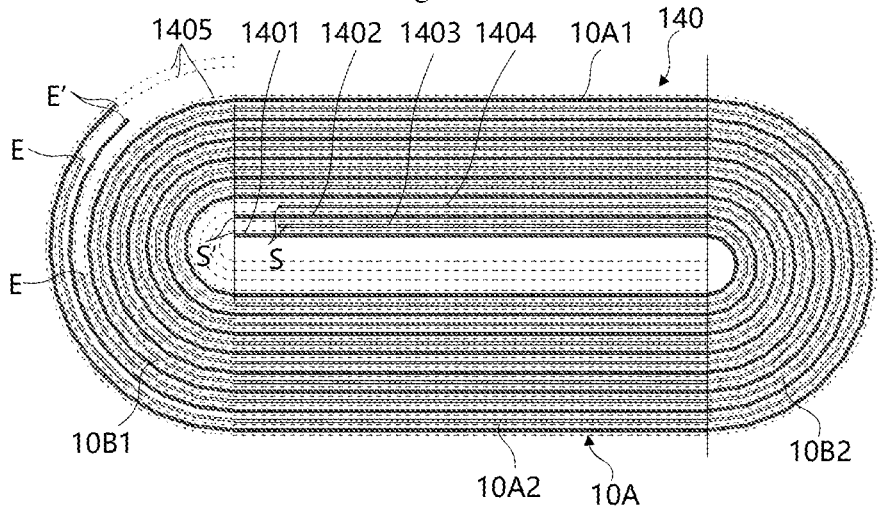

FIG. 14 is a structural schematic diagram showing that a flat electrode assembly is vertical to the cross section of the winding axis K in another embodiment of the present disclosure. The electrode assembly 140 includes a first negative electrode plate 1401, a second negative electrode plate 1402, a first positive electrode plate 1403, a second positive electrode plate 1404 and a plurality of diaphragms 1405, wherein the first negative electrode plate 1401, the first positive electrode plate 1403, the second negative electrode plate 1402 and the second positive electrode plate 1404 are superimposed alternately in sequence, and the first negative electrode plate 1401 is separated from the first positive electrode plate 1403 through a diaphragm 1405, the first positive electrode plate 1403 is separated from the second negative electrode plate 1402 through another diaphragm 1405, the second negative electrode plate 1402 is separated from the second positive electrode plate 1404 through another diaphragm 1405, and all the first negative electrode plates 1401, the second negative electrode plates 1402, the first positive electrode plates 1403, the second positive electrode plates 1404 and the plurality of diaphragms 1405 are superimposed and then wound around a winding axis K to form a flat winding structure.

In the present embodiment, two ends, along the winding axis K, of the negative active substance area of the first negative electrode plate 1401 both exceed the corresponding ends, along the winding axis K, of the positive active substance coating area of the adjacent first positive electrode plate 1403, two ends, along the winding axis K, of the negative active substance area of the second negative electrode plate 1402 both respectively exceed the corresponding ends, along the winding axis K, of the positive active substance coating area of the adjacent first positive electrode plate 1403 and the second positive electrode plate 1404. As to the specific conditions of two ends, along the winding axis K, of the negative active substance area of the first negative electrode plate 1401 and the second negative electrode plate 1402 and corresponding ends of the positive active substance area of the adjacent positive electrode plate, for example, the exceeded size, please refer to the content of the two ends, along the winding axis K, of the negative active substance area of the negative electrode plate 2 and corresponding ends of the positive active substance area of the adjacent positive electrode plate described in the above embodiments of FIGS. 6-11, which will not be repeated redundantly herein.

The structure of the electrode assembly 140 of the present embodiment is basically similar to the structure of the electrode assembly described in the embodiment of FIG. 12, and the differences will be described below.

In the winding structure of the electrode assembly 140 of the present embodiment, the innermost ring in the winding structure is a ring enclosed by the first negative electrode plates 1401, and the outermost ring of the winding structure is a ring enclosed by the second negative electrode plates 1402.

In the winding structure of the electrode assembly of the present embodiment, the positions of the second winding tail ends E' of the first negative electrode plate 1401 and the second negative electrode plate 1402 are different, for example, the second winding tail ends E' of the first negative electrode plate 1401 and the second negative electrode plate 1402 are respectively arranged at the same turning area (for example, the first turning area 10B1), and the second winding tail ends E' of the first negative electrode plate 1401 and the second negative electrode plate 1402 are not flush.

The winding structure of the electrode assembly 140 described above can reduce the difference between the number of layers of electrode plates of the first sub-flattening area 10A1 and the second sub-flattening area 10A2. When the electrode assembly expands and is in contact with the housing, and when the inner wall of the housing exerts a counter-acting force to the two planes of the electrode assembly, the stress exerted onto the electrode plates of the first sub-flattening area 10A1 and the second sub-flattening area 10A2 is consistent.

Figure 15:
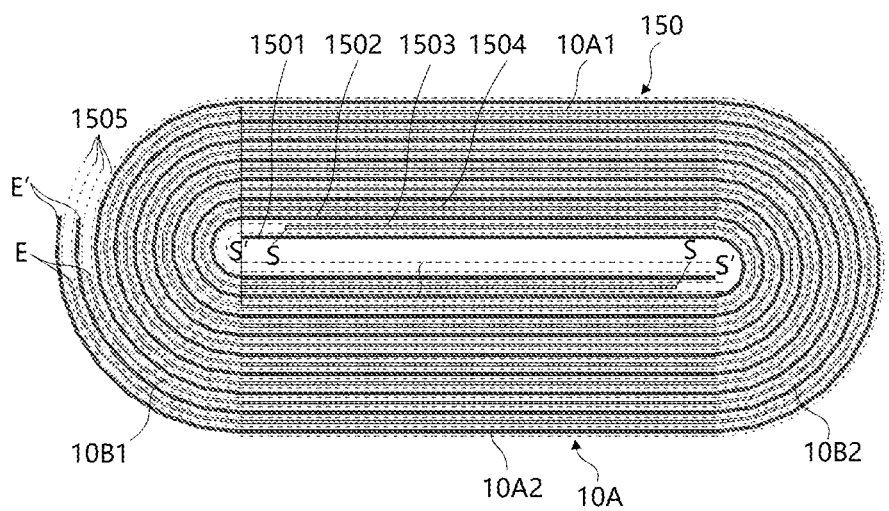

FIG. 15 is a structural schematic diagram showing that a flat electrode assembly is vertical to the cross section of the winding axis K in another embodiment of the present disclosure. The electrode assembly 150 includes a first negative electrode plate 1501, a second negative electrode plate 1502, a first positive electrode plate 1503, a second positive electrode plate 1504 and a plurality of diaphragms 1505, wherein the first negative electrode plate 1501, the first positive electrode plate 1503, the second negative electrode plate 1502 and the second positive electrode plate 1504 are superimposed alternately in sequence, and the first negative electrode plate 1501 is separated from the first positive electrode plate 1503 through a diaphragm 1505, the first positive electrode plate 1503 is separated from the second negative electrode plate 1502 through another diaphragm 1505, the second negative electrode plate 1502 is separated from the second positive electrode plate 1504 through another diaphragm 1505, and all the first negative electrode plates 1501, the second negative electrode plates 1502, the first positive electrode plates 1503, the second positive electrode plates 1504 and the plurality of diaphragms 1505 are superimposed and then wound around a winding axis K to form a flat winding structure.

In the present embodiment, two ends, along the winding axis K, of the negative active substance area of the first negative electrode plate 1501 both exceed the corresponding ends, along the winding axis K, of the positive active substance coating area of the adjacent first positive electrode plate 1503, two ends, along the winding axis K, of the negative active substance area of the second negative electrode plate 1502 both respectively exceed the corresponding ends, along the winding axis K, of the positive active substance coating area of the adjacent first positive electrode plate 1503 and the second positive electrode plate 1504. Moreover, as to the specific conditions of two ends, along the winding axis K, of the negative active substance area of the first negative electrode plate 1501 and the second negative electrode plate 1502 and corresponding ends of the positive active substance area of the adjacent positive electrode plate, for example, the exceeded size, please refer to the content of the two ends, along the winding axis K, of the negative active substance area of the negative electrode plate 2 and corresponding ends of the positive active substance area of the adjacent positive electrode plate described in the above embodiments of FIGS. 6-11, which will not be repeated redundantly herein.

The structure of the electrode assembly 150 of the present embodiment is basically similar to the structure of the electrode assembly described in the embodiment of FIG. 12, and the differences will be described below. In the winding structure of the electrode assembly of the present embodiment, the innermost ring in the winding structure is a ring enclosed jointly by the first negative electrode plates 1501 and the second negative electrode plates 1502, and the outermost ring of the winding structure is a ring enclosed by the second negative electrode plates 1502.

In the winding structure of the electrode assembly 150 of the present embodiment, the positions of the first winding initial ends S of the first positive electrode plate 1503 and the second positive electrode plate 1504 are different, for example, the first winding initial ends S of the first positive electrode plate 1503 and the second positive electrode plate 1504 are respectively arranged at the first sub-flattening area 10A1 and the second sub-flattening area 10A2, and the first winding initial ends S of the first positive electrode plate 1503 and the second positive electrode plate 1504 are not flush.

The positions of the second winding initial ends S of the first negative electrode plate 1501 and the second negative electrode plate 1502 are also different, for example, the second winding initial ends S of the first negative electrode plate 1501 and the second negative electrode plate 1502 are respectively arranged at the first sub-flattening area 10A1 and the second sub-flattening area 10A2, and the second winding initial ends S of the first negative electrode plate 1501 and the second negative electrode plate 1502 are not flush.

The winding structure of the electrode assembly described above can reduce the step formed by the first positive electrode plate 1503 and the second positive electrode plate 1504 at the first winding initial end S, and reduce the step formed by the first negative electrode plate 1501 and the second negative electrode plate 1502 at the second winding initial end S', so as to reduce local stress exerted onto the electrode plate at the winding initial end after the electrode assembly expands and is in contact with the housing 20, prevent cracking of the electrode plate or falling off of the active substance, and improve the reliability of long-term operation of the electrode assembly.

Figure 16:
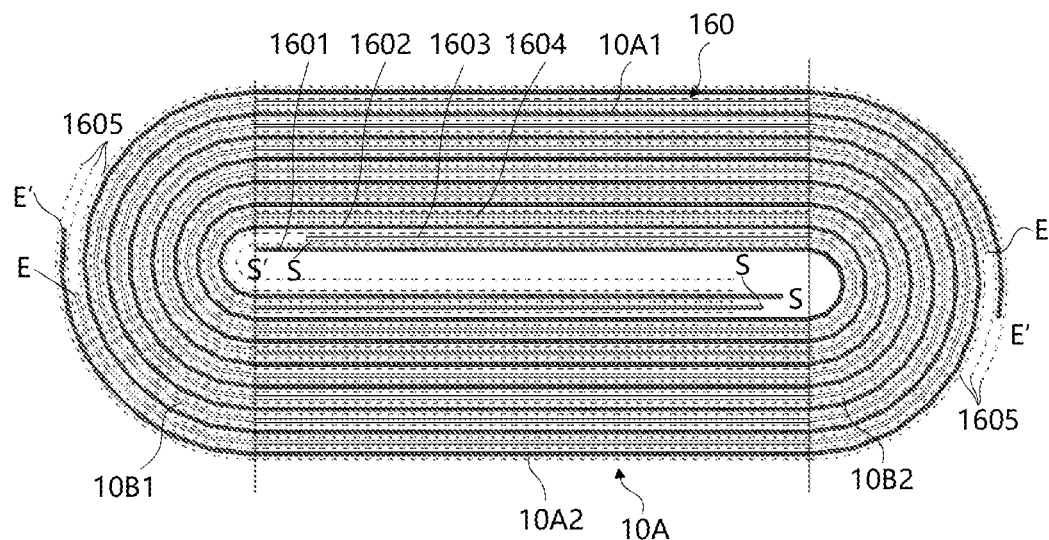

FIG. 16 is a structural schematic diagram showing that a flat electrode assembly is vertical to the cross section of the winding axis K in another embodiment of the present disclosure. The electrode assembly 160 includes a first negative electrode plate 1601, a second negative electrode plate 1602, a first positive electrode plate 1603, a second positive electrode plate 1604 and a plurality of diaphragms 1605, wherein the first negative electrode plate 1601, the first positive electrode plate 1603, the second negative electrode plate 1602 and the second positive electrode plate 1604 are superimposed alternately in sequence, and the first negative electrode plate 1601 is separated from the first positive electrode plate 1603 through a diaphragm 1605, the first positive electrode plate 1603 is separated from the second negative electrode plate 1602 through another diaphragm 1605, the second negative electrode plate 1602 is separated from the second positive electrode plate 1604 through another diaphragm 1605, and all the first negative electrode plates 1601, the second negative electrode plates 1602, the first positive electrode plates 1603, the second positive electrode plates 1604 and the plurality of diaphragms 1605 are superimposed and then wound around a winding axis K to form a flat winding structure.

In the present embodiment, two ends, along the winding axis K, of the negative active substance area of the first negative electrode plate 1601 both exceed the corresponding ends, along the winding axis K, of the positive active substance coating area of the adjacent first positive electrode plate 1603, two ends, along the winding axis K, of the negative active substance area of the second negative electrode plate 1602 both respectively exceed the corresponding ends, along the winding axis K, of the positive active substance coating area of the adjacent first positive electrode plate 1603 and the second positive electrode plate 1604.

Moreover, as to the specific conditions of two ends, along the winding axis K, of the negative active substance area of the first negative electrode plate 1601 and the second negative electrode plate 1602 and corresponding ends of the positive active substance area of the adjacent positive electrode plate, for example, the exceeded size, please refer to the content of the two ends, along the winding axis K, of the negative active substance area of the negative electrode plate 2 and corresponding ends of the positive active substance area of the adjacent positive electrode plate described in the above embodiments of FIGS. 6-11, which will not be repeated redundantly herein.

The structure of the electrode assembly 160 of the present embodiment is basically similar to the structure of the electrode assembly described in the embodiment of FIG. 12, and the differences will be described below. In the winding structure of the electrode assembly of the present embodiment, the innermost ring in the winding structure is a ring enclosed jointly by the first negative electrode plates 1601 and the second negative electrode plate 1602, and the outermost ring of the winding structure is a ring enclosed jointly by the first negative electrode plates 1601 and the second negative electrode plate 1602.

In the winding structure of the electrode assembly 160 of the present embodiment, the positions of the first winding initial ends S of the first positive electrode plate 1603 and the second positive electrode plate 1604 are different, for example, the first winding initial ends S of the first positive electrode plate 1603 and the second positive electrode plate 1604 are respectively arranged at the first sub-flattening area 10A1 and the second sub-flattening area 10A2, and the first winding initial ends S of the first positive electrode plate 1603 and the second positive electrode plate 1604 are not flush.

The positions of the second winding initial ends S' of the first negative electrode plate 1601 and the second negative electrode plate 1602 are also different, for example, the second winding initial ends S' of the first negative electrode plate 1601 and the second negative electrode plate 1602 are respectively arranged at the first sub-flattening area 10A1 and the second sub-flattening area 10A2, and the second winding initial ends S' of the first negative electrode plate 1601 and the second negative electrode plate 1602 are not flush.

The positions of the first winding tail ends E of the first positive electrode plate 1603 and the second positive electrode plate 1604 are different, for example, the first winding tail ends E of the first positive electrode plate 1603 and the second positive electrode plate 1604 are both arranged at different turning areas 10B, and the first winding tail ends E of the first positive electrode plate 1603 and the second positive electrode plate 1604 are not flush.

The positions of the second winding tail ends E' of the first negative electrode plate 1601 and the second negative electrode plate 1602 are also different, for example, the second winding tail ends E' of the first negative electrode plate 1601 and the second negative electrode plate 1602 are respectively arranged at two different turning areas 10B, and the second winding tail ends E' of the first negative electrode plate 1601 and the second negative electrode plate 1602 are not flush.

The winding structure of the electrode assembly described above can simultaneously reduce the steps formed by the first positive electrode plate 1603 and the second positive electrode plate 1604 at the first winding initial end S and the first winding tail end E, and reduce the steps formed by the first negative electrode plate 1601 and the second negative electrode plate 1602 at the second winding initial end S' and the second winding tail end E', so as to reduce local stress exerted onto the electrode plate at the winding initial end and the winding tail end after the electrode assembly expands and is in contact with the housing 20, prevent cracking of the electrode plate or falling off of the active substance, and improve the reliability of long-term operation of the electrode assembly.

On the basis of the above embodiments, on different radial directions of the winding structure, that is, at different circumferential positions of the winding structure, the difference of number of layers of electrode plates does not exceed a preset number of layers, the number of layers of electrode plates herein refers to the total number of layers of the positive electrode plates and negative electrode plates. Wherein the preset number of layers is smaller than or equal to the sum of the number of the plurality of positive electrode plates and the number of the plurality of negative electrode plates.

When the electrode assembly expands and is in contact with the housing 20, the housing 20 will exert a counteracting force onto the electrode assembly, such that the stress on each point of the circumferential direction of the electrode assembly is more uniform, thereby preventing the electrode assembly from having great difference in performances at various points in the using process. For example, two positive electrode plates are arranged, two negative electrode plates are arranged, the preset number of layers is smaller than or equal to four, and the smaller the difference of the number of layers of electrode plates is, the more uniform the stress exerted onto the electrode assembly at each point of the circumferential direction is.

As shown in FIG. 13 to FIG. 16, the outermost layer and the innermost layer of the winding structure are both negative electrode plates. The material of the positive active substance in the positive electrode plate is generally ternary material, lithium manganese oxide or lithium iron phosphate, and the material of the negative active substance in the negative electrode plate is generally graphite or silicon, since the material of the positive active substance is more expensive than the material of the negative active substance, therefore, the outermost layer and the innermost layer of the winding structure are coated by the negative electrode plates, and the positive active substance of the positive electrode plate can be sufficiently utilized, thereby not only improving energy utilization ratio of the winding structure, but also lowering difficulty in manufacturing process of the electrode assembly.

Optionally, a positive electrode plate is adopted in at least one of the outermost layer and the innermost layer of the winding structure, to reduce the manufacturing cost of the electrode assembly, for the positive electrode plate arranged at the outermost layer or the innermost layer, the positive active substance does not need to be coated on the surface, far away from the negative electrode plate, of the positive electrode plate.

FIG. 17 to FIG. 20 are structural schematic diagrams of a cylindrical electrode assembly.

Figure 17:
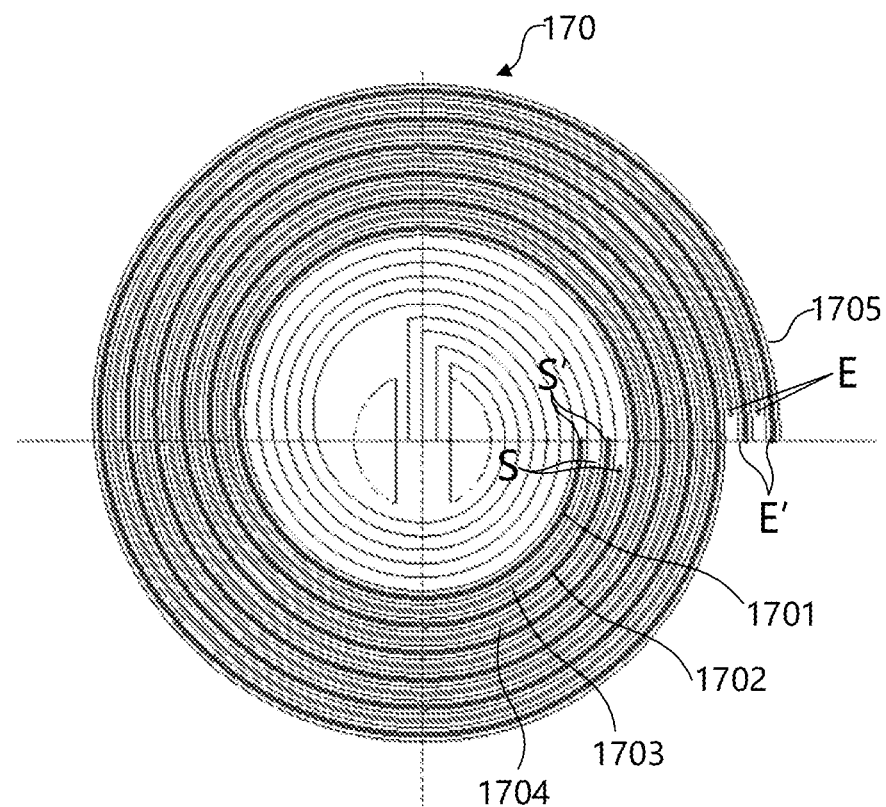
FIG. 17, FIG. 18, FIG. 19 and FIG. 20 are respectively sectional views of a first embodiment, a second embodiment, a third embodiment and a fourth embodiment of a cylindrical electrode assembly of the present disclosure in a plane vertical to a winding axis.

FIG. 17 is a structural schematic diagram showing that a cylindrical electrode assembly is vertical to the cross section of the winding axis K in another embodiment of the present disclosure. The electrode assembly 170 includes a first negative electrode plate 1701, a second negative electrode plate 1702, a first positive electrode plate 1703, a second positive electrode plate 1704 and a plurality of diaphragms 1705, wherein the first negative electrode plate 1701, the first positive electrode plate 1703, the second negative electrode plate 1702 and the second positive electrode plate 1704 are superimposed alternately in sequence, and the first negative electrode plate 1701 is separated from the first positive electrode plate 1703 through a diaphragm 1705, the first positive electrode plate 1703 is separated from the second negative electrode plate 1702 through another diaphragm 1705, the second negative electrode plate 1702 is separated from the second positive electrode plate 1704 through another diaphragm 1705, and all the first negative electrode plates 1701, the second negative electrode plates 1702, the first positive electrode plates 1703, the second positive electrode plates 1704 and the plurality of diaphragms 1705 are superimposed and then wound around a winding axis K to form a cylindrical winding structure.

In the electrode assembly 170 in the present embodiment, as to the structures and positions of the positive tab parts of the first positive electrode plate 1703 and the second positive electrode plate 1704 and the negative tab parts of the first negative electrode plate 1701 and the second negative electrode plate 1702, please refer to the related contents of the positive tab parts and the negative tab parts described in the above embodiments of FIG. 6 to FIG. 11, which will not be repeated redundantly herein.

In the present embodiment, as to the following specific conditions: on different radial directions of the winding structure, that is, at different positions of the circumferential direction of the winding structure, the difference between the number of layers of electrode plates is no greater than the number of preset layers, please also refer to the related contents described in the above embodiments of FIG. 6 to FIG. 11, which will not be repeated redundantly herein.

As to the electrode assembly 170 of the present embodiment, the negative active substance area respectively included in the first negative electrode plate 1701 and the second negative electrode plate 1702 can be the same as the negative active substance area included in the negative electrode plate described in the above embodiments of FIG. 6 to FIG. 11, and the positive active substance area respectively included in the first positive electrode plate 1703 and the second positive electrode plate 1704 can be the same as the positive active substance area included in the positive electrode plate described in the above embodiments of FIG. 6 to FIG. 11, which will not be repeated redundantly herein.

In the present embodiment, two ends, along the winding axis K, of the negative active substance area of the first negative electrode plate 1701 both exceed the corresponding ends, along the winding axis K, of the positive active substance coating area of the adjacent first positive electrode plate 1703, two ends, along the winding axis K, of the negative active substance area of the second negative electrode plate 1702 both respectively exceed the corresponding ends, along the winding axis K, of the positive active substance coating area of the adjacent first positive electrode plate 1703 and the second positive electrode plate 1704. Moreover, as to the specific conditions of two ends, along the winding axis K, of the negative active substance area of the first negative electrode plate 1701 and the second negative electrode plate 1702 and corresponding ends of the positive active substance area of the adjacent positive electrode plate, for example, the exceeded size, please refer to the content of the two ends, along the winding axis K, of the negative active substance area of the negative electrode plate and corresponding ends of the positive active substance area of the adjacent positive electrode plate described in the above embodiments of FIGS. 6-11, which will not be repeated redundantly herein.

In the winding structure, the innermost ring in the winding structure is a ring enclosed by the first negative electrode plates 1701, and the outermost ring of the winding structure is a ring enclosed by the second negative electrode plates 1702.

The positions of the first winding initial ends S of the first positive electrode plate 1703 and the second positive electrode plate 1704 are the same, for example, the first winding initial ends S of the first positive electrode plate 1703 and the second positive electrode plate 1704 are both arranged at the same radial direction of the winding structure, and the first winding initial ends S of the first positive electrode plate 1703 and the second positive electrode plate 1704 are flush.

The positions of the second winding initial ends S' of the first negative electrode plate 1701 and the second negative electrode plate 1702 are also the same, for example, the second winding initial ends S' of the first negative electrode plate 1701 and the second negative electrode plate 1702 are both arranged at the same radial direction of the winding structure, and the second winding initial ends S' of the first negative electrode plate 1701 and the second negative electrode plate 1702 are flush.

Along a reverse direction of the winding direction, the second winding initial end S' of the first negative electrode plate 1701 exceeds the first winding initial end S of the first positive electrode plate 1704. The second winding initial end S' of the second negative electrode plate 1702 exceeds the first winding initial end S of the second positive electrode plate 1703.

The positions of the first winding tail ends E of the first positive electrode plate 1703 and the second positive electrode plate 1704 are the same, for example, the first winding tail ends E of the first positive electrode plate 1703 and the second positive electrode plate 1704 are both arranged at the turning area 10B on the same side, and the first winding tail ends E of the first positive electrode plate 1703 and the second positive electrode plate 1704 are flush.

The positions of the second winding tail ends E' of the first negative electrode plate 1701 and the second negative electrode plate 1702 are also the same, for example, the second winding tail ends E' of the first negative electrode plate 1701 and the second negative electrode plate 1702 are both arranged in the same turning area 10B, and the second winding tail ends E' of the first negative electrode plate 1701 and the second negative electrode plate 1702 are flush.

Along a winding direction, the second winding tail end E' of the first negative electrode plate 1701 exceeds the first winding tail end E of the second positive electrode plate 1704. The second winding tail end E' of the second negative electrode plate 1702 exceeds the first winding tail end E of the first positive electrode plate 1703.

The winding structure described above can enable the length differences of the plurality of electrode plates before winding to be approximate, thereby being easy to wind.

Figure 18:
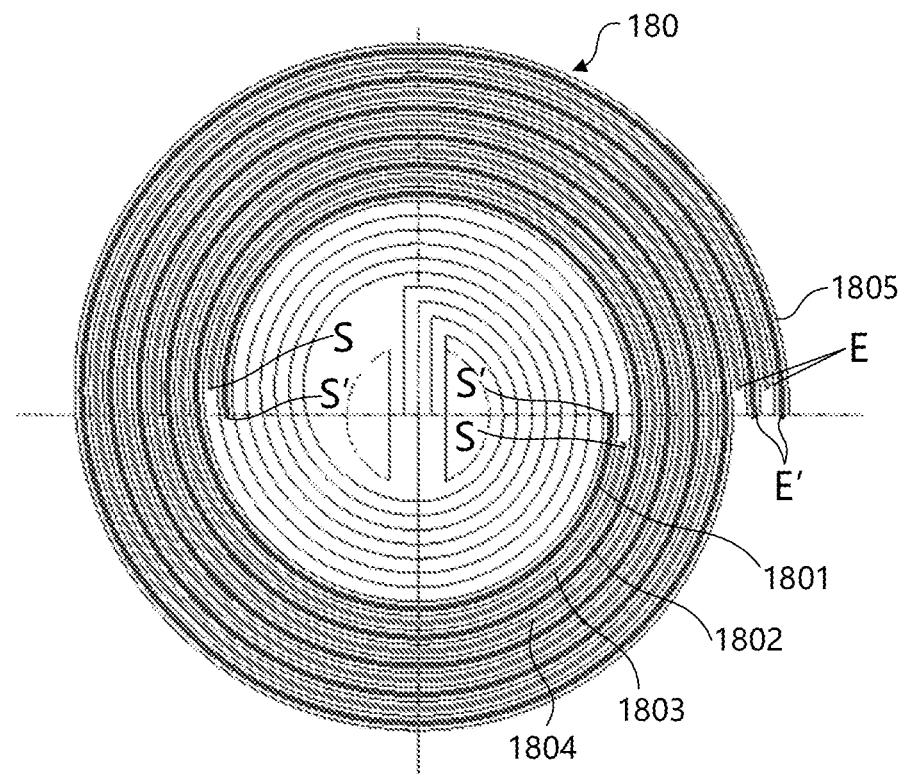

FIG. 18 is a structural schematic diagram showing that a cylindrical electrode assembly is vertical to the cross section of the winding axis K in another embodiment of the present disclosure. The electrode assembly 180 includes a first negative electrode plate 1801, a second negative electrode plate 1802, a first positive electrode plate 1803, a second positive electrode plate 1804 and a plurality of diaphragms 1805, wherein the first negative electrode plate 1801, the first positive electrode plate 1803, the second negative electrode plate 1802 and the second positive electrode plate 1804 are superimposed alternately in sequence, and the first negative electrode plate 1801 is separated from the first positive electrode plate 1803 through a diaphragm 1805, the first positive electrode plate 1803 is separated from the second negative electrode plate 1802 through another diaphragm 1805, the second negative electrode plate 1802 is separated from the second positive electrode plate 1804 through another diaphragm 1805, and all the first negative electrode plates 1801, the second negative electrode plates 1802, the first positive electrode plates 1803, the second positive electrode plates 1804 and the plurality of diaphragms 1805 are superimposed and then wound around a winding axis K to form a cylindrical winding structure.

In the present embodiment, two ends, along the winding axis K, of the negative active substance area of the first negative electrode plate 1801 both exceed the corresponding ends, along the winding axis K, of the positive active substance coating area of the adjacent first positive electrode plate 1803, two ends, along the winding axis K, of the negative active substance area of the second negative electrode plate 1802 both respectively exceed the corresponding ends, along the winding axis K, of the positive active substance coating area of the adjacent first positive electrode plate 1803 and the second positive electrode plate 1804. Moreover, as to the specific conditions of two ends, along the winding axis K, of the negative active substance area of the first negative electrode plate 1801 and the second negative electrode plate 1802 and corresponding ends of the positive active substance area of the adjacent positive electrode plate, for example, the exceeded size, please refer to the content of the two ends, along the winding axis K, of the negative active substance area of the negative electrode plate 2 and corresponding ends of the positive active substance area of the adjacent positive electrode plate 1 described in the above embodiments of FIGS. 6-11, which will not be repeated redundantly herein.

The structure of the present embodiment is basically similar to the structure described in the embodiment of FIG. 17, and the differences will be described below. In the winding structure of the present embodiment, the innermost ring of the winding structure is a ring enclosed jointly by the first negative electrode plates 1801 and the second negative electrode plates 1802, and the outermost ring of the winding structure is a ring enclosed by the first negative electrode plates 1801.

In the winding structure of the present embodiment, the positions of the first winding initial ends S of the first positive electrode plate 1803 and the second positive electrode plate 1804 are different, for example, the first winding initial ends S of the first positive electrode plate 1803 and the second positive electrode plate 1804 are respectively arranged at a relative radial direction of the winding structure, and the first winding initial ends S of the first positive electrode plate 1803 and the second positive electrode plate 1804 are not flush.

The positions of the second winding initial ends S of the first negative electrode plate 1801 and the second negative electrode plate 1802 are also different, for example, the second winding initial end S' of the first negative electrode plate 1801 and the second winding initial end S' of the second negative electrode plate 1802 are arranged at a relative radial direction of the winding structure, and the second winding initial ends S' of the first negative electrode plate 1801 and the second negative electrode plate 1802 are not flush.

The winding structure described above can reduce the step formed by the first positive electrode plate 1803 and the second positive electrode plate 1804 at the first winding initial end S, and reduce the step formed by the first negative electrode plate 1801 and the second negative electrode plate 1802 at the second winding initial end S', so as to reduce local stress exerted onto the electrode plate at the winding initial end after the electrode assembly expands and is in contact with the housing 20, prevent cracking of the electrode plate or falling off of the active substance, and improve the reliability of long-term operation of the electrode assembly.

Figure 19:
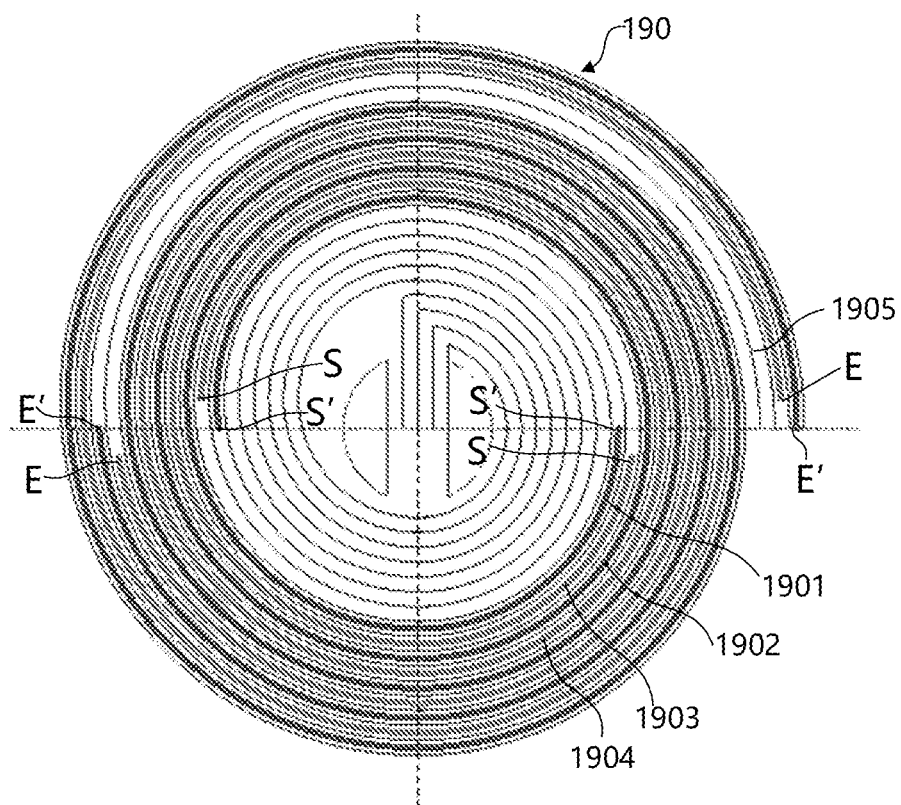

FIG. 19 is a structural schematic diagram showing that a cylindrical electrode assembly is vertical to the cross section of the winding axis K in another embodiment of the present disclosure. The electrode assembly 190 includes a first negative electrode plate 1901, a second negative electrode plate 1902, a first positive electrode plate 1903, a second positive electrode plate 1904 and a plurality of diaphragms 1905, wherein the first negative electrode plate 1901, the first positive electrode plate 1903, the second negative electrode plate 1902 and the second positive electrode plate 1904 are superimposed alternately in sequence, and the first negative electrode plate 1901 is separated from the first positive electrode plate 1903 through a diaphragm 1905, the first positive electrode plate 1903 is separated from the second negative electrode plate 1902 through another diaphragm 1905, the second negative electrode plate 1902 is separated from the second positive electrode plate 1904 through another diaphragm 1905, and all the first negative electrode plates 1901, the second negative electrode plates 1902, the first positive electrode plates 1903, the second positive electrode plates 1904 and the plurality of diaphragms 1905 are superimposed and then wound around a winding axis K to form a flat winding structure.

In the present embodiment, two ends, along the winding axis K, of the negative active substance area of the first negative electrode plate 1901 both exceed the corresponding ends, along the winding axis K, of the positive active substance coating area of the adjacent first positive electrode plate 1903, two ends, along the winding axis K, of the negative active substance area of the second negative electrode plate 1902 both respectively exceed the corresponding ends, along the winding axis K, of the positive active substance coating area of the adjacent first positive electrode plate 1903 and the second positive electrode plate 1904. Moreover, as to the specific conditions of two ends, along the winding axis K, of the negative active substance area of the first negative electrode plate 1901 and the second negative electrode plate 1902 and corresponding ends of the positive active substance area of the adjacent positive electrode plate, for example, the exceeded size, please refer to the content of the two ends, along the winding axis K, of the negative active substance area of the negative electrode plate 2 and corresponding ends of the positive active substance area of the adjacent positive electrode plate 1 described in the above embodiments of FIGS. 6-11, which will not be repeated redundantly herein.

The structure of the present embodiment is basically similar to the structure described in the embodiment of FIG. 18, and the differences will be described below. In the winding structure of the present embodiment, the innermost ring of the winding structure is a ring enclosed jointly by the first negative electrode plates 1901 and the second negative electrode plates 1902, and the outermost ring of the winding structure is a ring enclosed by the first negative electrode plates 1901.

In the winding structure of the present embodiment, the positions of the first winding tail ends E of the first positive electrode plate 1903 and the second positive electrode plate 1904 are different, and the second winding tail ends E' of the first negative electrode plate 1901 and the second negative electrode plate 1902 are also different.

Along a winding direction, the first negative electrode plate 1901 is arranged at the outermost layer and the end position of the second winding tail end E' exceeds the end position of the second winding tail end E' of the second negative electrode plate 1902, and the end position of the second winding tail end E' of the first positive electrode plate 1903 exceeds the end position of the second winding tail end E' of the second positive electrode plate 1904, for example, exceeding by half a ring, and the exceeded part presses inwards along a radial direction until the exceeded part is in contact with the electrode plates in the inner layer, to improve the stability of the winding structure.

The winding structure described above can simultaneously reduce the steps formed by the first positive electrode plate 1903 and the second positive electrode plate 1904 at the first winding initial end S and the first winding tail end E, and reduce the steps formed by the first negative electrode plate 1901 and the second negative electrode plate 1902 at the second winding initial end S' and the second winding tail end E', so as to reduce local stress exerted onto the electrode plate at the winding initial end and the winding tail end after the electrode assembly expands and is in contact with the housing 20, prevent cracking of the electrode plate or falling off of the active substance, and improve the reliability of long-term operation of the electrode assembly.

Moreover, the number of layers of the winding structure in different radial directions can be the same, for the cylindrical winding structure, when the electrode assembly expands and is in contact with the housing 20, the stress on each point along the circumferential direction is consistent.

Figure 20:
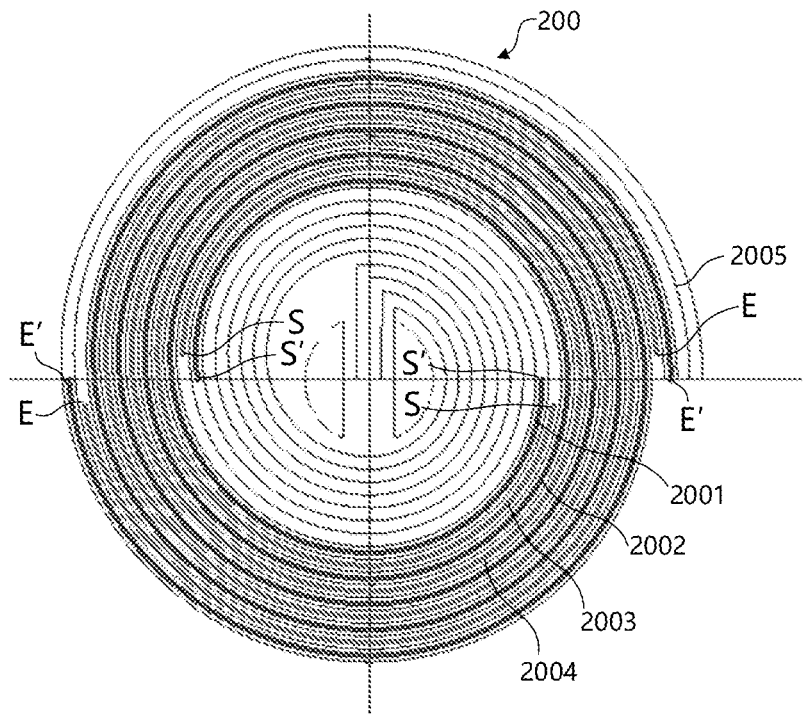

FIG. 20 is a structural schematic diagram showing that a cylindrical electrode assembly is vertical to the cross section of the winding axis K in another embodiment of the present disclosure. The electrode assembly 200 includes a first negative electrode plate 2001, a second negative electrode plate 2002, a first positive electrode plate 2003, a second positive electrode plate 2004 and a plurality of diaphragms 2005, wherein the first negative electrode plate 2001, the first positive electrode plate 2003, the second negative electrode plate 2002 and the second positive electrode plate 2004 are superimposed alternately in sequence, and the first negative electrode plate 2001 is separated from the first positive electrode plate 2003 through a diaphragm 2005, the first positive electrode plate 2003 is separated from the second negative electrode plate 2002 through another diaphragm 2005, the second negative electrode plate 2002 is separated from the second positive electrode plate 2004 through another diaphragm 2005, and all the first negative electrode plates 2001, the second negative electrode plates 2002, the first positive electrode plates 2003, the second positive electrode plates 2004 and the plurality of diaphragms 2005 are superimposed and then wound around a winding axis K to form a flat winding structure.

In the present embodiment, two ends, along the winding axis K, of the negative active substance area of the first negative electrode plate 2001 both exceed the corresponding ends, along the winding axis K, of the positive active substance coating area of the adjacent first positive electrode plate 2003, two ends, along the winding axis K, of the negative active substance area of the second negative electrode plate 2002 both respectively exceed the corresponding ends, along the winding axis K, of the positive active substance coating area of the adjacent first positive electrode plate 2003 and the second positive electrode plate 2004. Moreover, as to the specific conditions of two ends, along the winding axis K, of the negative active substance area of the first negative electrode plate 2001 and the second negative electrode plate 2002 and corresponding ends of the positive active substance area of the adjacent positive electrode plate, for example, the exceeded size, please refer to the content of the two ends, along the winding axis K, of the negative active substance area of the negative electrode plate 2 and corresponding ends of the positive active substance area of the adjacent positive electrode plate 1 described in the above embodiments of FIGS. 6-11, which will not be repeated redundantly herein.

The structure of the present embodiment is basically similar to the structure described in the embodiment of FIG. 18, and the differences will be described below. In the winding structure of the present embodiment, the innermost ring in the winding structure is a ring enclosed jointly by the first negative electrode plates 2001 and the second negative electrode plates 2002, and the outermost ring of the winding structure is a ring enclosed jointly by the first negative electrode plates 2001 and the second negative electrode plates 2002.

Along a winding direction, the second negative electrode plate 2002 is arranged at the outermost layer and the end position of the second winding tail end E' exceeds the end position of the second winding tail end E' of the first negative electrode plate 2001, and the end position of the second winding tail end E' of the second positive electrode plate 2004 exceeds the end position of the second winding tail end E' of the first positive electrode plate 2003, for example, exceeding by half a ring.

The winding structure described above can simultaneously reduce the steps formed by the first positive electrode plate 2003 and the second positive electrode plate 2004 at the first winding initial end S and the first winding tail end E, and reduce the steps formed by the first negative electrode plate 2001 and the second negative electrode plate 2002 at the second winding initial end S' and the second winding tail end E', so as to reduce local stress exerted onto the electrode plate at the winding initial end and the winding tail end after the electrode assembly expands and is in contact with the housing 20, prevent cracking of the electrode plate or falling off of the active substance, and improve the reliability of long-term operation of the electrode assembly.

Moreover, the number of layers of the winding structure in different radial directions can be the same, for the cylindrical winding structure, when the electrode assembly expands and is in contact with the housing 20, the stress on each point along the circumferential direction is consistent.

In addition, this structure can avoid bending of the outermost layer of electrode plates and the penultimate layer of electrode plates at the winding tail end of other electrode plates, such that all the layers of electrode plates are in reliable contact, and no local stress is easily produced on the electrode plate, thereby preventing cracking of the electrode plate or falling off of the active substance.

Figure 21:
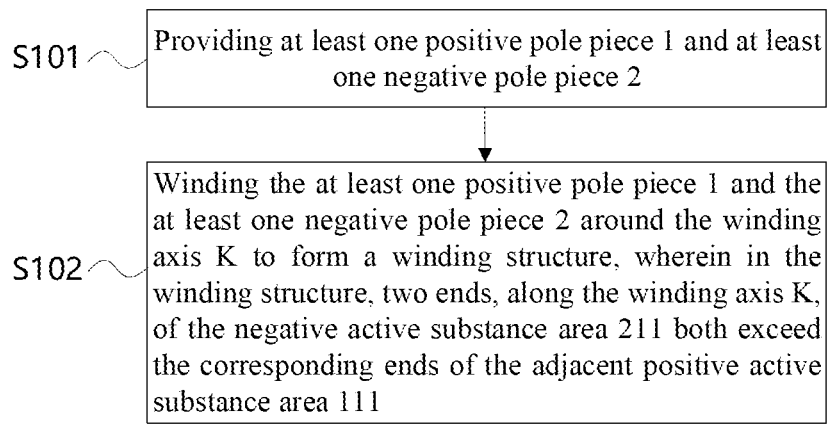
FIG. 21 is a flow diagram of some embodiments of a manufacturing method of an electrode assembly of the present disclosure.

Secondly, the present disclosure further provides a manufacturing method of an electrode assembly, in some embodiments, the flow diagram as shown in FIG. 21 includes:

step 101, providing at least one positive electrode plate 1 and at least one negative electrode plate 2, wherein the sum of the number of all the positive electrode plates 1 and all the negative electrode plates 2 is greater than or equal to 3; and step 102, winding the at least one positive electrode plate 1 and the at least one negative electrode plate 2 around the winding axis K to form a winding structure;

wherein in the winding structure, the positive electrode plate 1 of the at least one positive electrode plate 1 and the negative electrode plate 2 of the at least one negative electrode plate 2 are arranged in a superimposing manner along a direction vertical to the winding axis K; each positive electrode plate 1 of the at least one positive electrode plate 1 includes a positive main body part 11, at least part of the area of the superimposing surface of the positive main body part 11 is a positive active substance area 111, each negative electrode plate 2 in at least one negative electrode plate 2 includes a negative main body part 21, at least part of the area of the superimposing surface of the negative main body part 21 is a negative active substance area 211, and two ends, along the winding axis K, of the negative active substance area 211 both exceed the corresponding ends of the adjacent positive active substance area 111.

Wherein, step 102 is performed after step 101. In step 101, specifically, the plurality of positive electrode plates 1, the plurality of diaphragms 3 and the plurality of negative electrode plates 2 are superimposed in the thickness direction of the electrode plate, the plurality of positive electrode plates 1 and the plurality of negative electrode plates 2 are arranged alternately one by one, and a diaphragm 3 is arranged between adjacent positive electrode plate 1 and negative electrode plate 2.

In the present embodiment, through setting the plurality of positive electrode plates 1 and the plurality of negative electrode plates 2, the number of winding turns of the electrode assembly 10 can be reduced, the winding errors in the winding process can be reduced, the size by which the negative active substance area 211 exceeds the positive active substance area 111 can be more easily controlled, thereby being capable of reducing the reserved size of the negative active substance area 211, reserving space for increasing the area of the positive active substance area 111 and the area of the negative active substance area 211, so as to improve the energy density of the electrode assembly 10.

Figure 22:
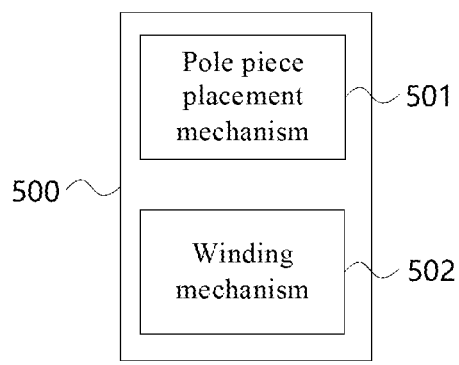
FIG. 22 is a structural schematic diagram of some embodiments of a manufacturing device of an electrode assembly of the present disclosure.
Figure 23:
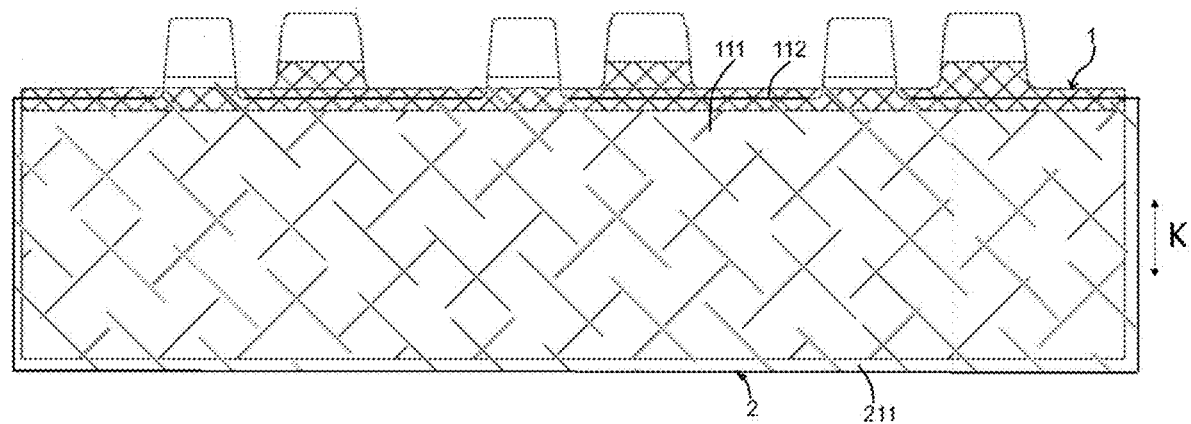
FIG. 23 is a structural schematic diagram of some embodiments of a positive electrode plate in an electrode assembly of the present disclosure.

Finally, the present disclosure further provides a manufacturing device 500 of an electrode assembly. In some embodiments, as shown in FIG. 22, the manufacturing device 500 includes: an electrode plate placement mechanism 501 and a winding mechanism 502.

The electrode plate placement mechanism 501 is configured to provide at least one positive electrode plate 1 and at least one negative electrode plate 2, wherein the sum of the number of all the positive electrode plates 1 and all the negative electrode plates 2 is greater than or equal to 3; and a winding mechanism 502, configured to wind the at least one positive electrode plate 1 and the at least one negative electrode plate 2 around the winding axis K to form a winding structure.

Wherein in the winding structure, the positive electrode plate 1 in the plurality of positive electrode plates 1 and the negative electrode plate 2 in the plurality of negative electrode plates 2 are arranged alternately along a direction vertical to the winding axis K, each positive electrode plate 1 includes a positive main body part 11, at least part of the area, along the winding axis K, of the positive main body part 11 is a positive active substance area 111, each negative electrode plate 2 includes a negative main body part 21, at least part of the area, along the winding axis K, of the negative main body part 21 is the negative active substance area 211, and two ends, along the winding axis K, of the negative active substance area 211 both exceed corresponding ends of the adjacent positive active substance area 111. The winding mechanism 502 can provide a stable winding tensile force for the superimposed electrode plates.

The electrode assembly 10 produced through the manufacturing device 500 can reduce the winding errors in the winding process, and easily controls the size by which the negative active substance area 211 exceeds the positive active substance area 111, thereby reducing the reserved size of the negative active substance area 211, reserving space for increasing the area of the positive active substance area 111 and the negative active substance area 211, and further improving the energy density of the electrode assembly 10.

Finally, it should be noted that, the above embodiments are merely for illustrating the technical solutions of the present disclosure, rather than for limiting the present disclosure. Although the present disclosure is described in detail with reference to the above embodiments, those skilled in the art should understand that, technical solutions recorded in each above embodiment can still be modified or part of the technical features can be equivalently substituted; while all the modifications or substitutions do not enable the essence of the corresponding technical solutions to depart from the spirit and scope of the technical solutions of each embodiment of the present disclosure.

What is claimed is:

1. An electrode assembly, comprising:
at least one positive electrode plate and at least one negative electrode plate, wherein the sum of a number of all the positive electrode plates and all the negative electrode plates is greater than or equal to 3, and at least one positive electrode plate and at least one negative electrode plate are wound around a winding axis to form a winding structure,
wherein in the winding structure, a positive electrode plate of the at least one positive electrode plate and a negative electrode plate of the at least one negative electrode plate are arranged in a superimposing manner along a direction vertical to the winding axis,
wherein each positive electrode plate of the at least one positive electrode plate comprises a positive main body part, and at least part of an area of a superimposing surface of the positive main body part is a positive active substance area,
wherein each negative electrode plate of the at least one negative electrode plate comprises a negative main body part, at least part of an area of a superimposing surface of the negative main body part is a negative active substance area, and two ends, along the winding axis, of the negative active substance area both exceed corresponding ends of the adjacent positive active substance area, and
wherein when a number of the at least one positive electrode plate is greater than or equal to 2, positions of a first winding initial ends of the at least two positive electrode plates are arranged in a staggered manner in a circumferential direction of the winding structure, and/or, when a number of the at least one negative electrode plate is greater than or equal to 2, positions of a second winding initial ends of the at least two negative electrode plates are arranged in a staggered manner in the circumferential direction of the winding structure.

2. The electrode assembly according to claim 1, wherein two ends, along the winding axis, of the negative active substance area both exceed corresponding ends of the adjacent positive active substance area by a range of 0.2 mm to 5 mm.

3. The electrode assembly according to claim 1, wherein the positive electrode plate further comprises at least one positive tab part which extends outwards along a direction of the winding axis from the positive main body part, and the negative electrode plate further comprises at least one negative tab part which extends outwards along the direction of the winding axis from the negative main body part.

4. The electrode assembly according to claim 3, wherein part of an area of the positive main body part is a first insulating layer coating area, the first insulating layer coating area is arranged on a side, adjacent to the positive tab part, of the positive active substance area, and a first end, adjacent to the negative tab part along the direction of the winding axis, of the negative main body part is arranged in the first insulating layer coating area.

5. The electrode assembly according to claim 3, wherein the negative active substance area covers a whole superimposing surface, along the winding axis, of the negative main body part, and a second end, opposite to the negative tab part along the direction of the winding axis, of the negative main body part exceeds the positive active substance area.

6. The electrode assembly according to claim 5, wherein part of an area of the positive main body part is a first insulating layer coating area, the first insulating layer coating area is arranged on a side, adjacent to the positive tab part, of the positive active substance area, and a first end, adjacent to the negative tab part along the direction of the winding axis, of the negative main body part is arranged in the first insulating layer coating area.

7. The electrode assembly according to claim 2, wherein the positive electrode plate further comprises at least one positive tab part which extends outwards along a direction of the winding axis from the positive main body part, and the negative electrode plate further comprises at least one negative tab part which extends outwards along the direction of the winding axis from the negative main body part.

8. The electrode assembly according to claim 7, wherein part of the area of the positive main body part is a first insulating layer coating area, the first insulating layer coating area is arranged on a side, adjacent to the positive tab part, of the positive active substance area, and a first end, adjacent to the negative tab part along a direction of the winding axis, of the negative main body part is arranged in the first insulating layer coating area.

9. The electrode assembly according to claim 7, wherein the negative active substance area covers a whole superimposing surface, along the winding axis, of the negative main body part, and a second end, opposite to the negative tab part along the direction of the winding axis, of the negative main body part exceeds the positive active substance area.

10. The electrode assembly according to claim 9, wherein part of the area of the positive main body part is a first insulating layer coating area, the first insulating layer coating area is arranged on a side, adjacent to the positive tab part, of the positive active substance area, and a first end, adjacent to the negative tab part along a direction of the winding axis, of the negative main body part is arranged in the first insulating layer coating area.

11. The electrode assembly according to claim 1, wherein when a number of at least one positive electrode plate is greater than or equal to 2, positions of a first winding tail ends of at least two positive electrode plates are different.

12. The electrode assembly according to claim 1, wherein when a number of at least one negative electrode plate is greater than or equal to 2, positions of a second winding tail ends of at least two negative electrode plates are different.

13. The electrode assembly according to claim 1, wherein the winding structure is flat, and comprises a flattening area and turning areas arranged on two sides of the flattening area, and wherein a first winding tail ends of at least one positive electrode plate are arranged in a turning area; and/or, a second winding tail ends of at least one negative electrode plate are arranged in a turning area.

14. The electrode assembly according to claim 1, wherein in different radial directions of a winding structure, a difference of layers of electrode plates does not exceed a number of preset layers.

15. The electrode assembly according to claim 14, wherein a number of preset layers is smaller than or equal to a sum of a number of all the positive electrode plates and all the negative electrode plates.

16. The electrode assembly according to claim 1, wherein an outermost layer and an innermost layer of a winding structure are all negative electrode plates.

17. A battery, comprising:
a housing; and
an electrode assembly according to claim 1, wherein the electrode assembly is arranged in the housing.

18. A battery module, comprising a plurality of batteries according to claim 17.

\* \* \* \* \*